US007503661B2

(12) United States Patent
Masubuchi et al.

(10) Patent No.: US 7,503,661 B2
(45) Date of Patent: Mar. 17, 2009

(54) PROJECTION OPTICAL SYSTEM

(75) Inventors: Tomokazu Masubuchi, Osaka (JP); Masayuki Imaoka, Izumiotsu (JP); Jun Ishihara, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 505 days.

(21) Appl. No.: 11/283,470

(22) Filed: Nov. 18, 2005

(65) Prior Publication Data

US 2006/0114430 A1 Jun. 1, 2006

(30) Foreign Application Priority Data

Nov. 26, 2004 (JP) ............................. 2004-341917

(51) Int. Cl.
*G03B 21/28* (2006.01)
*G03B 21/56* (2006.01)
*G02B 7/182* (2006.01)
*G02B 5/10* (2006.01)
*H04N 5/74* (2006.01)

(52) U.S. Cl. .................... 353/99; 359/449; 359/850; 359/858; 348/782

(58) Field of Classification Search .................. 353/99, 353/37, 74, 77–79, 98; 359/443, 449, 460, 359/850, 858, 859, 861; 348/782, 783
See application file for complete search history.

(56) References Cited

U.S. PATENT DOCUMENTS 5,237,399 A 8/1993 Inada et al. .................... 358/60
6,779,897 B2 * 8/2004 Konno et al. .................. 353/99

FOREIGN PATENT DOCUMENTS

| JP | 4-319937 A | 11/1992 |
|----|------------|---------|
| JP | 5-281501 A | 10/1993 |
| JP | 7-49477 A  | 2/1995  |

* cited by examiner

*Primary Examiner*—Rochelle-Ann J Blackman
(74) *Attorney, Agent, or Firm*—Sidley Austin LLP

(57) ABSTRACT

In a projection optical system for obliquely performing enlargement projection of an image formed on a display device surface onto a screen surface, a plurality of reflective surfaces are provided, at least one of which is a curved reflective surface having an optical power. Letting the curved reflective surface, out of said at least one curved reflective surface, having the largest effective optical region be the largest curved reflective surface, the reflective surface other than the largest curved reflective surface is slightly decentered with the largest curved reflective surface kept in a fixed state so as to perform pixel shift on the screen surface in a vertical direction, or a horizontal direction, or an oblique direction, or vertical and horizontal directions within the range of a pixel pitch.

24 Claims, 25 Drawing Sheets

Y=262.138,Z=-1.72574e-18

Y=261.9,Z=-116.305

Y=261.566,Z=-232.609

Y=261.737,Z=-349.053

Y=261.688,Z=-465.247

Y=130.662,Z=0

Y=130.553,Z=-116.312

Y=130.284,Z=-232.4

Y=130.149,Z=-348.369

Y=130.527,Z=-464.961

Y=-0.0794316,Z=-1.43811e-1

Y=0.0649911,Z=-116.211

Y=0.281516,Z=-232.4

Y=0.2797,Z=-348.541

Y=0.556748,Z=-465.579

Y=-130.779,Z=2.30098e-18

Y=-130.504,Z=-115.707

Y=-129.977,Z=-231.909

Y=-129.756,Z=-348.588

Y=-129.524,Z=-466.18

Y=-261.126,Z=1.43811e-19

Y=-261.041,Z=-114.893

Y=-261.018,Z=-230.851

Y=-261.518,Z=-347.878

Y=-262.225,Z=-465.456

Y=260.96,Z=8.62868e-19

Y=260.723,Z=-116.199

Y=260.393,Z=-232.398

Y=260.57,Z=-348.741

Y=260.533,Z=-464.841

Y=129.703,Z=7.90962e-19

Y=129.594,Z=-116.215

Y=129.325,Z=-232.208

Y=129.19,Z=-348.085

Y=129.57,Z=-464.59

Y=-0.823898,Z=0

Y=-0.681452,Z=-116.126

Y=-0.470009,Z=-232.232

Y=-0.478262,Z=-348.291

Y=-0.208275,Z=-465.249

Y=-131.321,Z=1.15049e-18

Y=-131.05,Z=-115.637

Y=-130.533,Z=-231.769

Y=-130.325,Z=-348.378

Y=-130.108,Z=-465.901

Y=-261.492,Z=-5.75245e-19

Y=-261.411,Z=-114.84

Y=-261.4,Z=-230.744

Y=-261.917,Z=-347.716

Y=-262.646,Z=-465.239

FIG.9A Y=263.007,Z=3.45147e-18 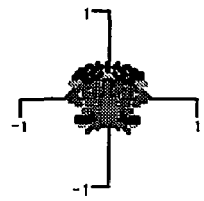
FIG.9B Y=262.768,Z=-116.326 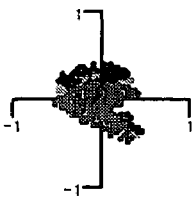
FIG.9C Y=262.434,Z=-232.652 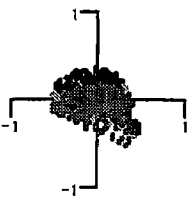
FIG.9D Y=262.604,Z=-349.118 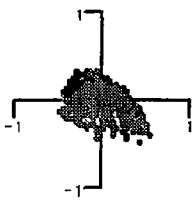
FIG.9E Y=262.547,Z=-465.328 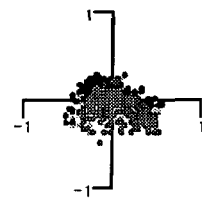
FIG.9F Y=131.461,Z=7.19056e-20 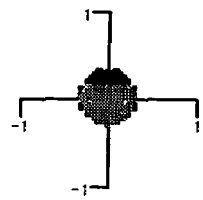
FIG.9G Y=131.352,Z=-116.328 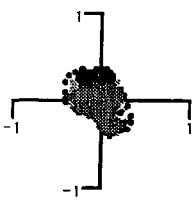
FIG.9H Y=131.084,Z=-232.432 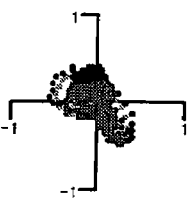
FIG.9I Y=130.953,Z=-348.419 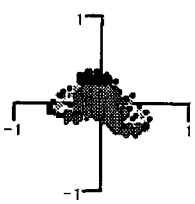
FIG.9J Y=131.335,Z=-465.027 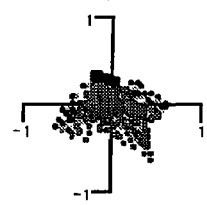
FIG.9K Y=0.667188,Z=5.75245e-19 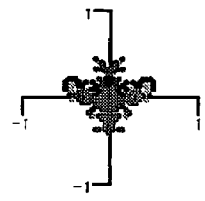
FIG.9L Y=0.811931,Z=-116.223 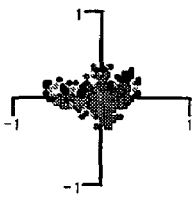
FIG.9M Y=1.02956,Z=-232.425 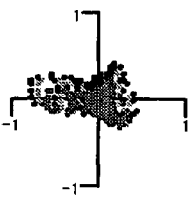
FIG.9N Y=1.02996,Z=-348.577 
FIG.9O Y=1.30957,Z=-465.626 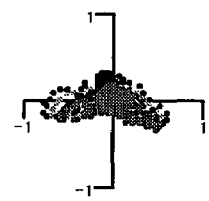
FIG.9P Y=-130.068,Z=-1.15049e-18 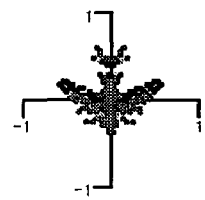
FIG.9Q Y=-129.792,Z=-115.717 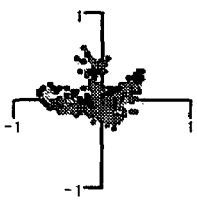
FIG.9R Y=-129.261,Z=-231.929 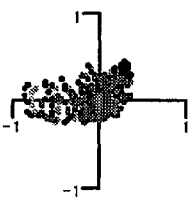
FIG.9S Y=-129.035,Z=-348.617 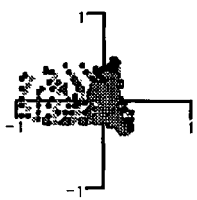
FIG.9T Y=-128.796,Z=-466.219 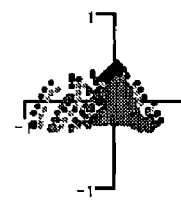
FIG.9U Y=-260.445,Z=8.62868e-19 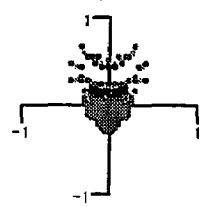
FIG.9V Y=-260.357,Z=-114.902 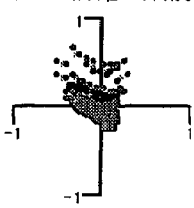
FIG.9W Y=-260.325,Z=-230.868 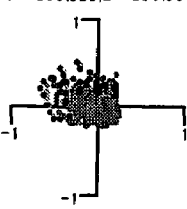
FIG.9X Y=-260.812,Z=-347.901 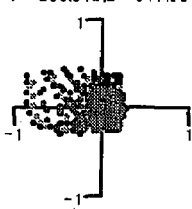
FIG.9Y Y=-261.507,Z=-465.491 

Y=262.882,Z=-2.87623e-19

Y=262.643,Z=-116.307

Y=262.308,Z=-232.614

Y=262.477,Z=-349.062

Y=262.415,Z=-465.254

Y=131.403,Z=2.15717e-19

Y=131.293,Z=-116.313

Y=131.022,Z=-232.403

Y=130.888,Z=-348.376

Y=131.267,Z=-464.969

Y=0.661996,Z=8.62868e-19

Y=0.804918,Z=-116.214

Y=1.01795,Z=-232.405

Y=1.01337,Z=-348.545

Y=1.28926,Z=-465.581

Y=-130.037,Z=8.62868e-19

Y=-129.762,Z=-115.712

Y=-129.235,Z=-231.917

Y=-129.015,Z=-348.596

Y=-128.781,Z=-465.187

Y=-260.387,Z=4.31434e-19

Y=-260.3,Z=-114.899

Y=-260.271,Z=-230.861

Y=-260.764,Z=-347.889

Y=-261.463,Z=-465.472

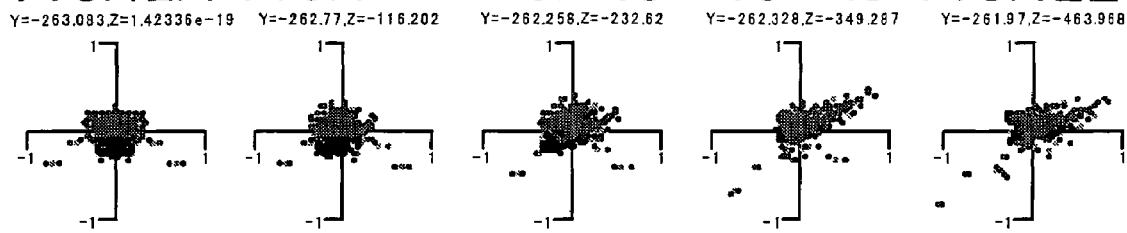
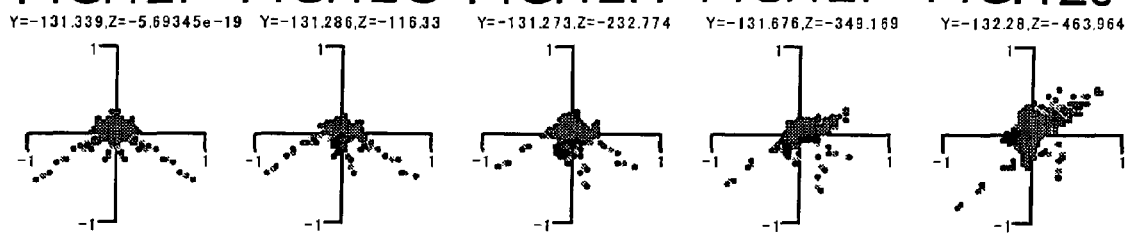
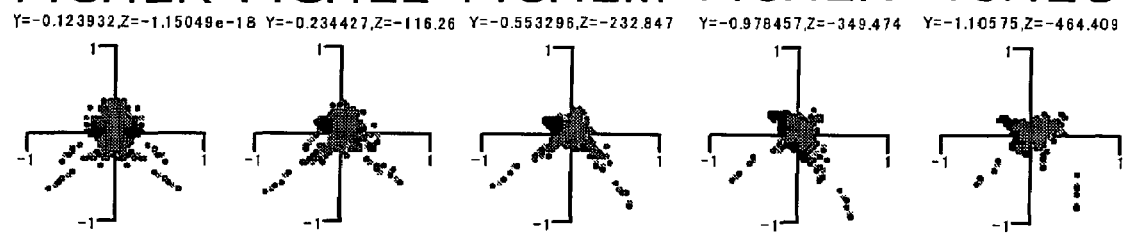
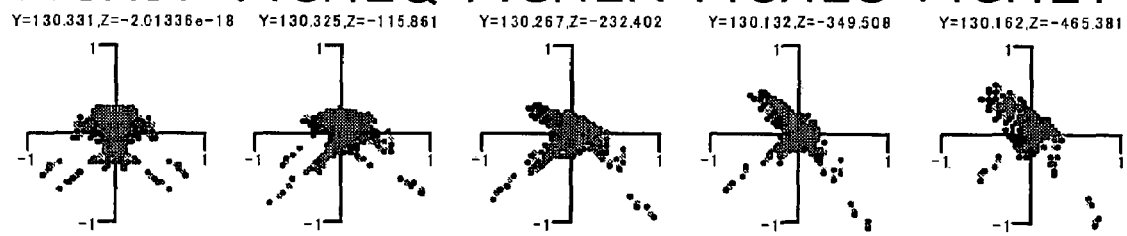
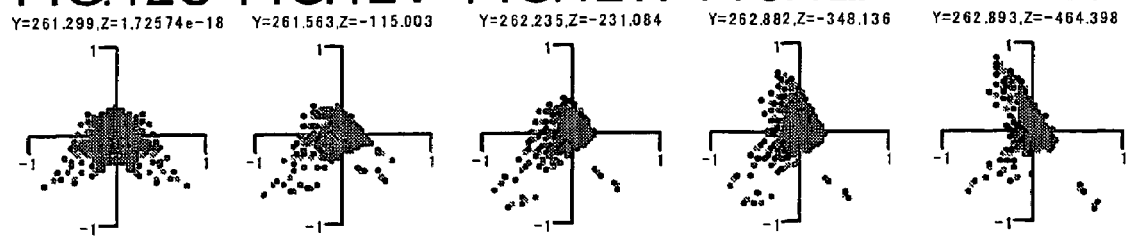

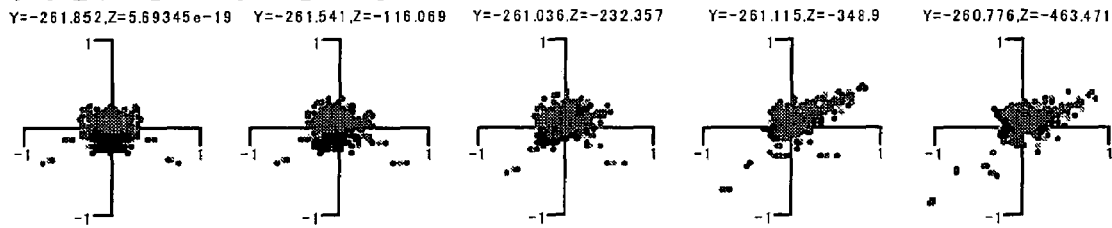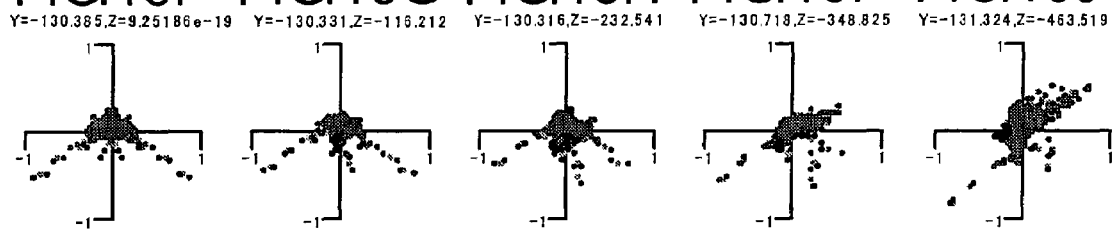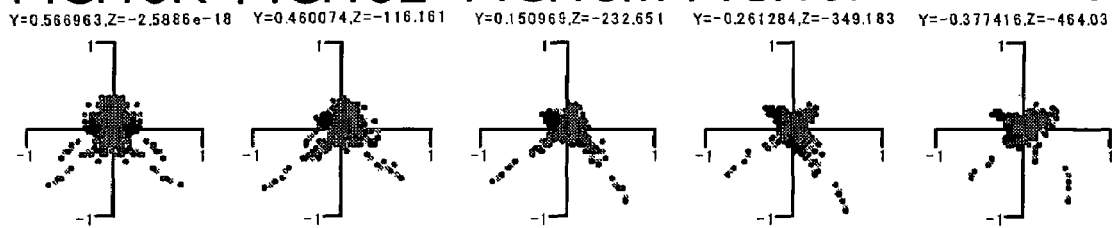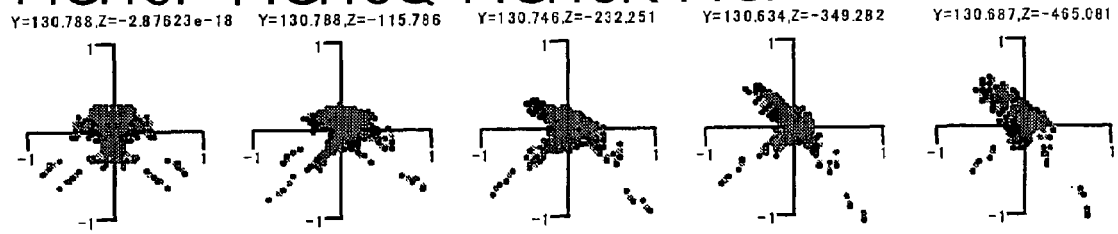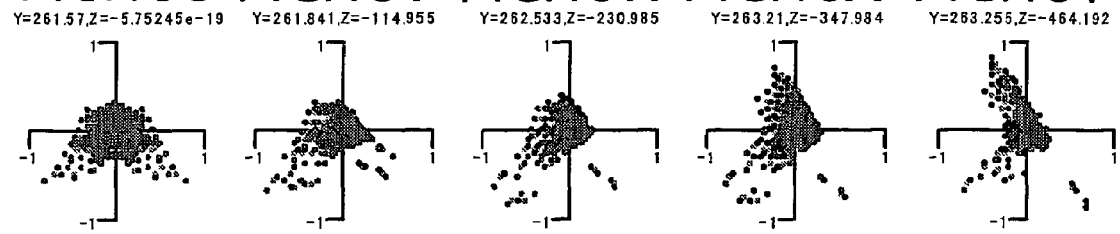

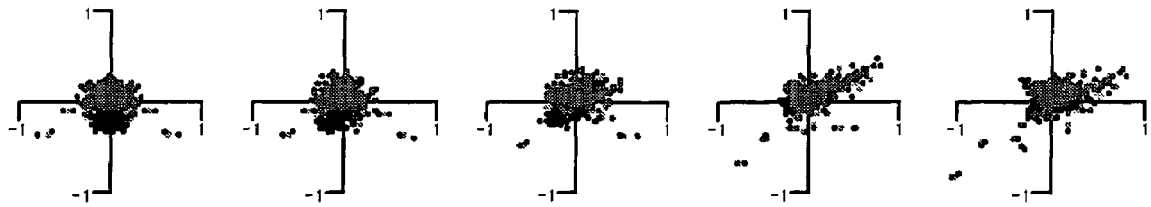
FIG.14A Y=-263.949,Z=-9.96354e-19
FIG.14B Y=-263.636,Z=-116.227
FIG.14C Y=-263.124,Z=-232.671
FIG.14D Y=-263.194,Z=-349.366
FIG.14E Y=-262.83,Z=-464.072
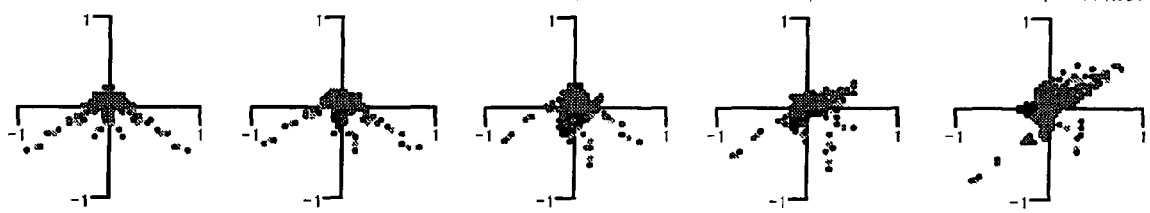
FIG.14F Y=-132.116,Z=-9.25186e-19
FIG.14G Y=-132.063,Z=-116.346
FIG.14H Y=-132.052,Z=-232.808
FIG.14I Y=-132.459,Z=-349.222
FIG.14J Y=-133.068,Z=-464.039
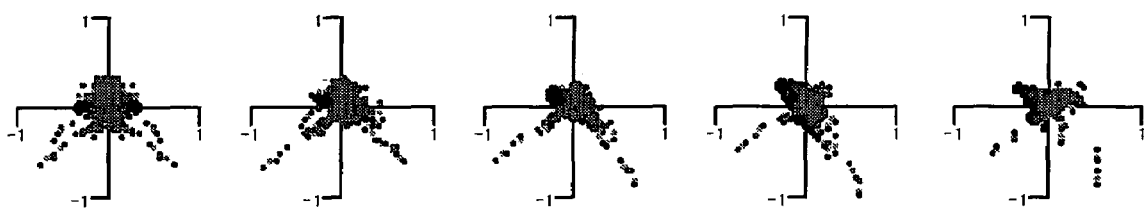
FIG.14K Y=-0.841987,Z=-8.62868e-19
FIG.14L Y=-0.954134,Z=-116.27
FIG.14M Y=-1.27737,Z=-232.868
FIG.14N Y=-1.70837,Z=-349.507
FIG.14O Y=-1.84136,Z=-464.456
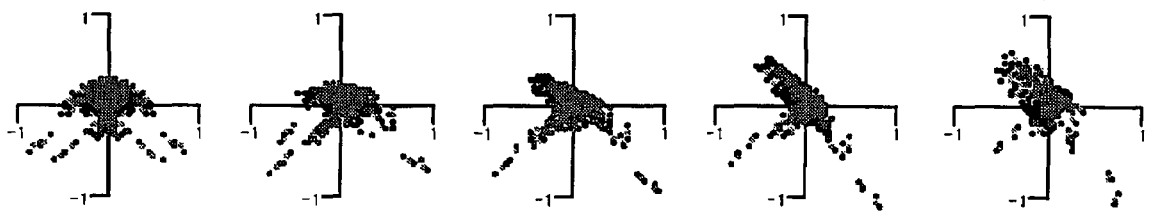
FIG.14P Y=129.645,Z=0
FIG.14Q Y=129.637,Z=-115.868
FIG.14R Y=129.573,Z=-232.417
FIG.14S Y=129.43,Z=-349.531
FIG.14T Y=129.455,Z=-465.412
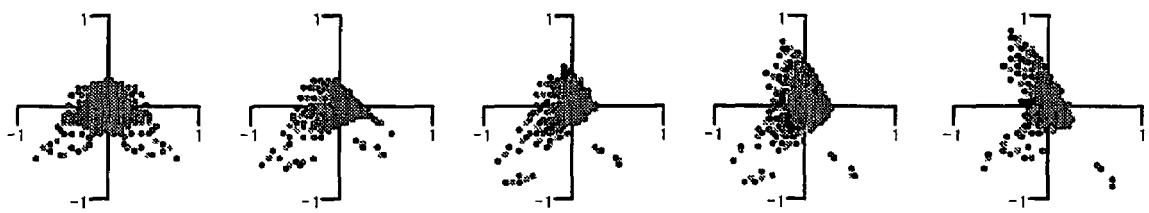
FIG.14U Y=260.625,Z=-2.5886e-18
FIG.14V Y=260.886,Z=-115.011
FIG.14W Y=261.549,Z=-231.099
FIG.14X Y=262.187,Z=-348.159
FIG.14Y Y=262.196,Z=-464.432

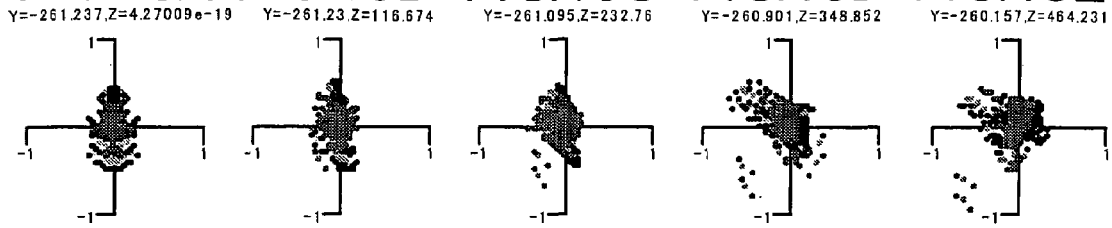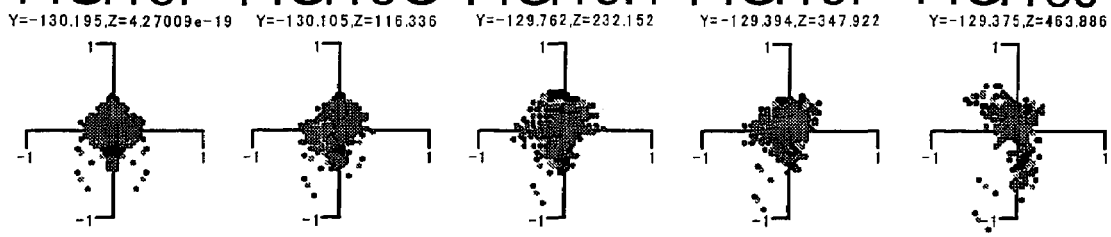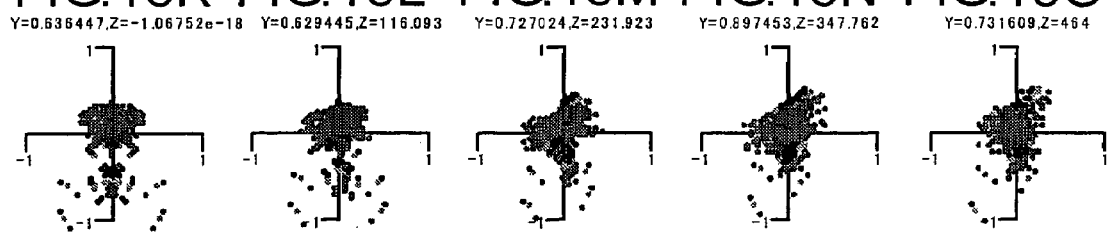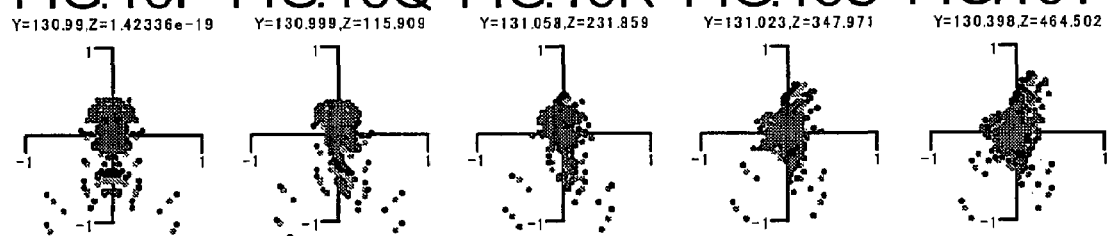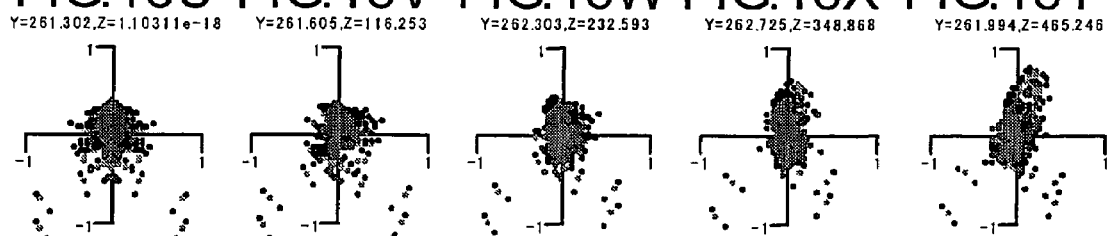

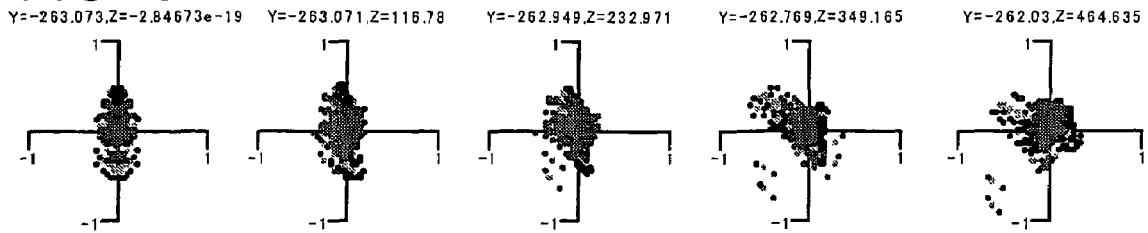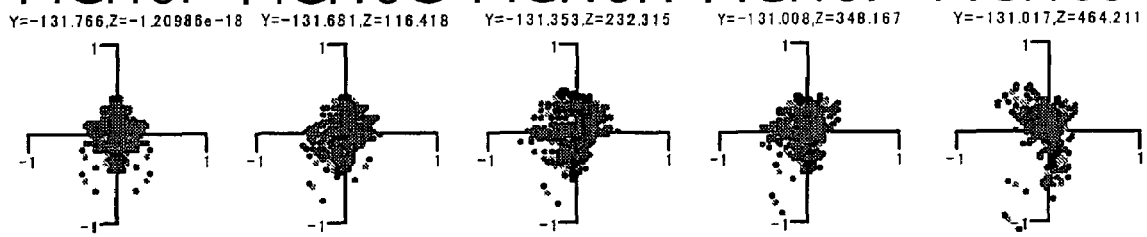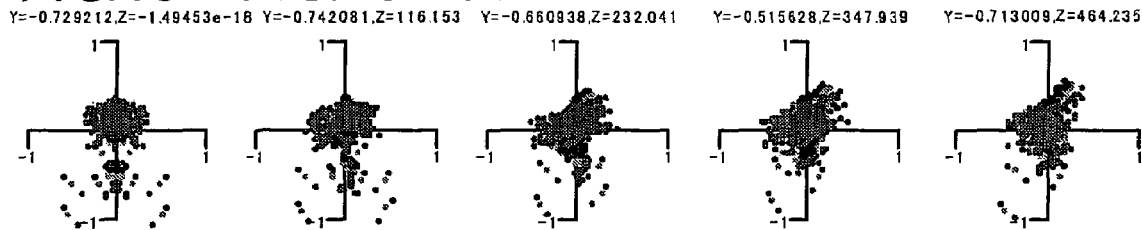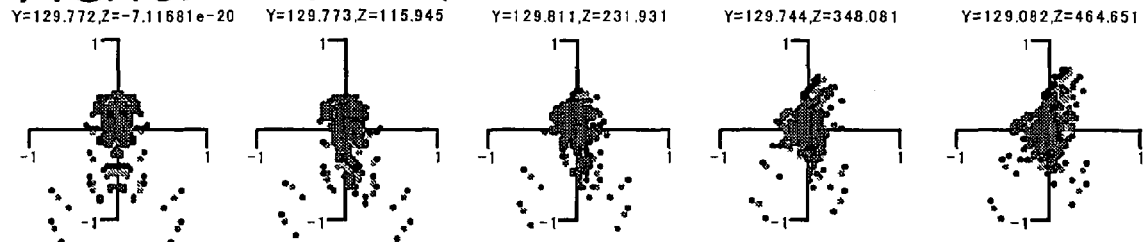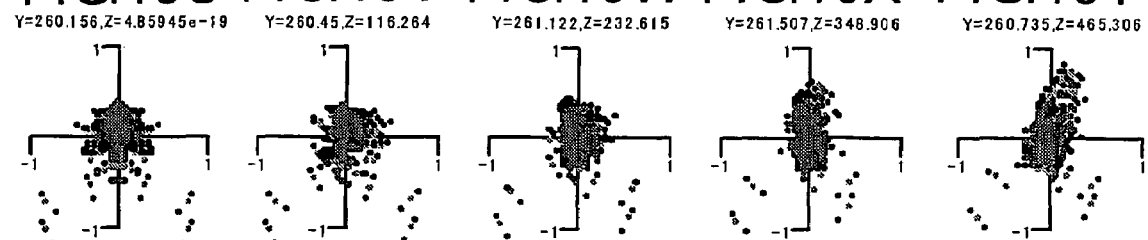

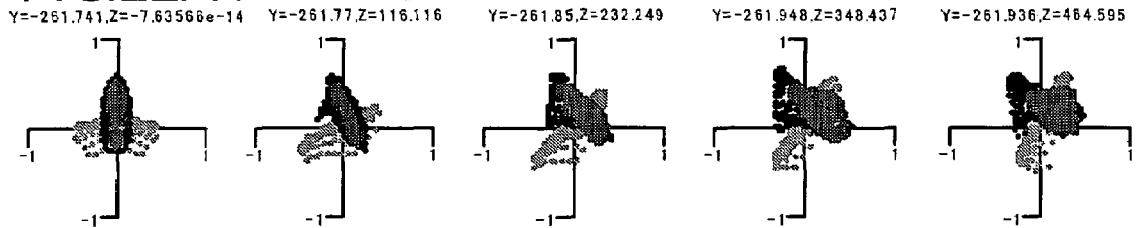
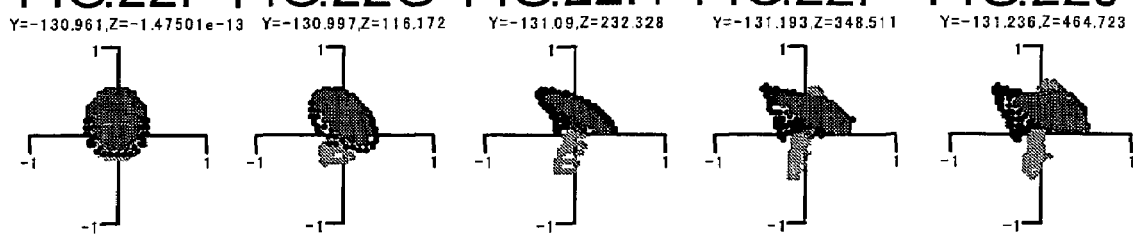
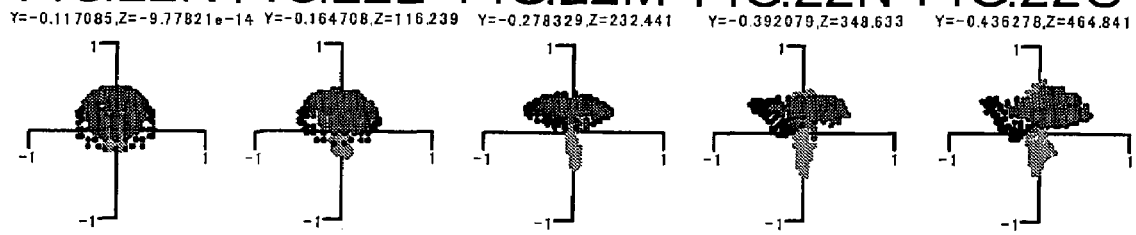
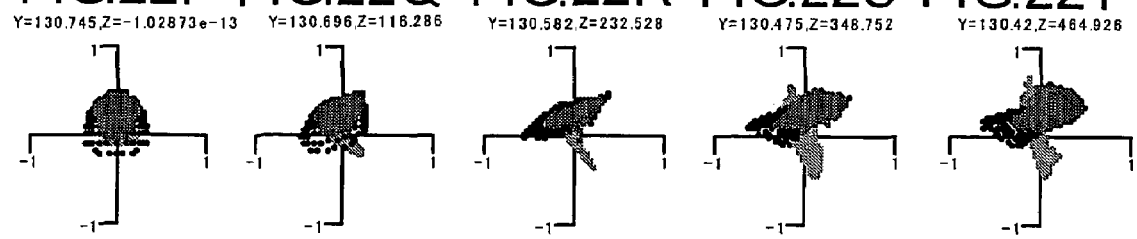
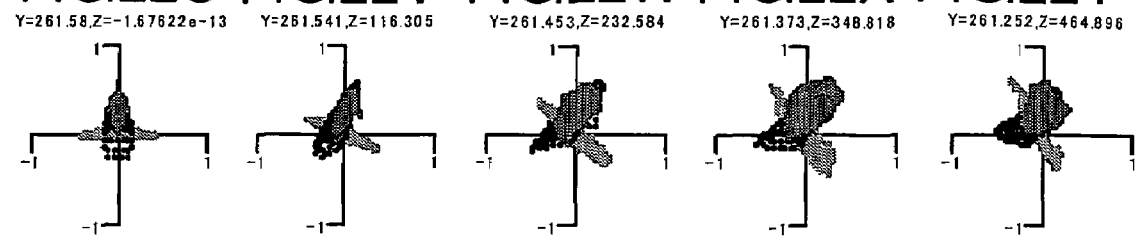

Y=-248.836,Z=-5.75245e-19  Y=-248.768,Z=111.182  Y=-248.822,Z=222.384  Y=-249.19,Z=333.166  Y=-249.77,Z=443.819

Y=-124.462,Z=-2.66881e-19  Y=-124.417,Z=111.151  Y=-124.433,Z=222.2  Y=-124.619,Z=333.023  Y=-124.943,Z=443.85

Y=0.0228501,Z=4.88163e-19  Y=0.0227504,Z=111.085  Y=0.00347498,Z=222.076  Y=-0.0756292,Z=332.946  Y=-0.208524,Z=443.889

Y=124.574,Z=-2.78951e-19  Y=124.562,Z=110.996  Y=124.514,Z=221.93  Y=124.462,Z=332.831  Y=124.64,Z=444.107

Y=248.844,Z=-8.20362e-19  Y=248.849,Z=110.876  Y=248.931,Z=221.797  Y=249.287,Z=332.991  Y=249.804,Z=444.615

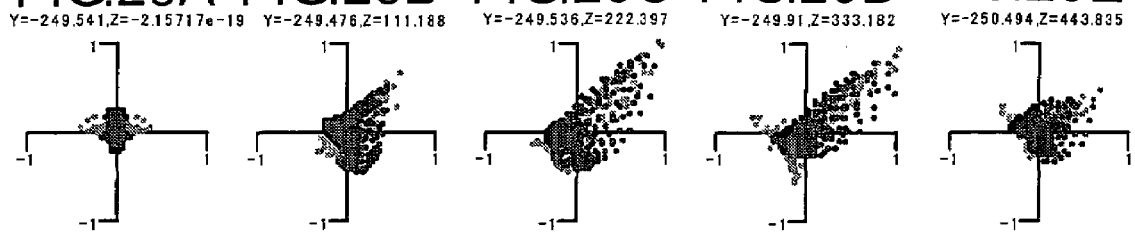
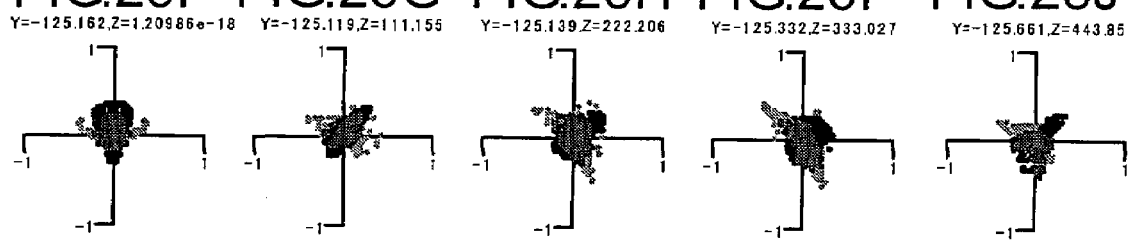
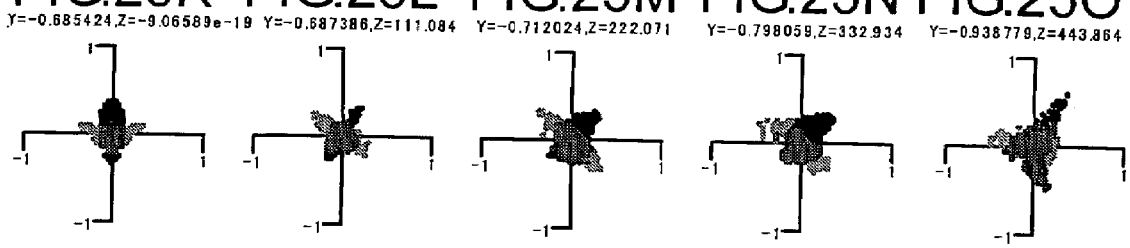
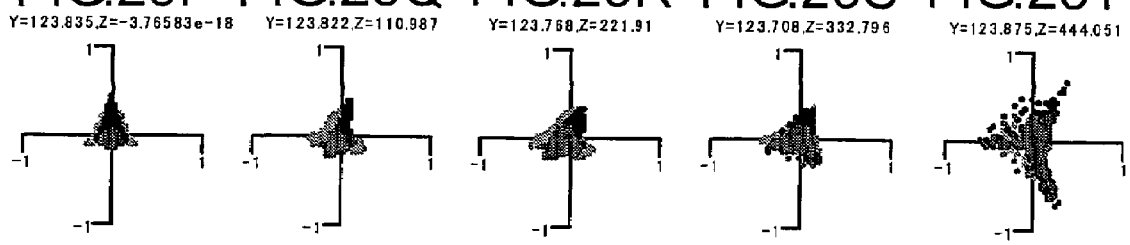
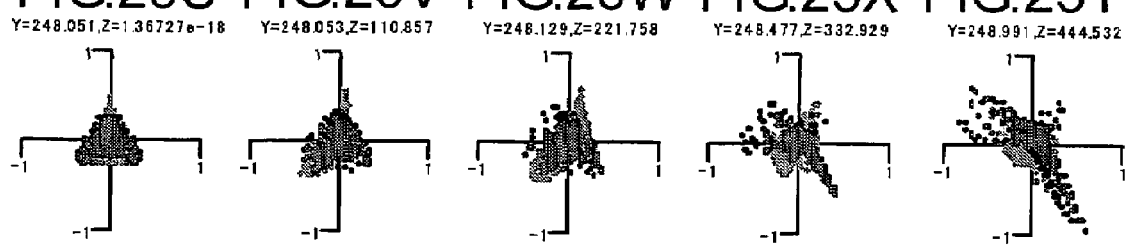

PROJECTION OPTICAL SYSTEM

This application is based on Japanese Patent Application No. 2004-341917 filed on Nov. 26, 2004, the contents of which are hereby incorporated by reference.

BACKGROUND OF THE INVENTION

1. Field of the Invention

The present invention relates to a projection optical system, and more specifically to a projection optical system that is mounted in a projector having, for example, a digital micromirror device or a LCD (liquid crystal display), as a display device and that obliquely performs enlargement projection of an image formed on the surface of the display device onto the screen surface.

2. Description of Related Art

As an image display for use in digital satellite broadcasts at home and home theater, low-cost and high-performance projectors having a digital micromirror device or a LCD as a display device have been becoming increasingly widespread in recent years. Thus, there has been a great demand for a slim rear projector that does not occupy too much space even in a small room, which requires a wider-angle projection optical system. Moreover, the volume of information displayed has been considerably larger than before, and the display device has been provided with an even higher resolution than before accordingly, thus leading to a demand for smooth, clear, and high-quality images.

To achieve a low-cost rear projector with a high resolution, so-called pixel shift has been conventionally practiced by which an image projected on the screen surface is shifted by a small degree (for example, one half of a pixel) so as to increase the apparent number of pixels. The practice of pixel shift causes pixels to be superimposed on one another, which makes the contour of the pixels projected on the screen surface less outstanding, thereby permitting display of a smooth image. Moreover, due to its ability to increase the volume of information displayed on the screen surface without changing the number of pixels of the display device, the pixel shift is very effective in achieving a higher-grade image through an improvement in the resolution. As a projector employing this pixel shift, Patent publications 1 and 3 propose those which achieve pixel shift by way of slightly decentering a mirror while Patent publication 2 proposes one which achieves pixel shift by way of slightly decentering a flat glass.

[Patent publication 1] Japanese Patent Application Laid-open No. H4-319937

[Patent publication 2] U.S. Pat. No. 5,237,399

[Patent publication 3] Japanese Patent Application Laid-open No. H7-49477

However, with the projector constructions proposed in Patent publications 1 to 3, image projection is performed with an optical power possessed by a refractive optical system; therefore, an increase in the number of components and an increase in the back focus as a result of adding a mirror or a flat glass leads to upsizing of the entire apparatus and a cost increase. Especially in a case where a mirror or a flat glass to be slightly decentered is large in size, this results in upsizing of mechanisms such as a holding mechanism, a decentering mechanism, and the like, and thus requires complicated mechanisms for achieving slight decentering with even more accuracy, which contributes a further cost increase and upsizing. Further, the projector proposed in Patent document 2 suffers from chromatic aberration occurring with the flat glass to be slightly decentered.

SUMMARY OF THE INVENTION

In view of the problem described above, the present invention has been made, and it is an object of the invention to provide a low-cost, compact projection optical system capable of performing pixel shift with high accuracy while maintaining a favorable optical performance.

To achieve the object described above, according to one aspect of the invention refers to a projection optical system for obliquely performing enlargement projection of an image formed on a display device surface onto a screen surface. A plurality of reflective surfaces are provided, at least one of which is a curved reflective surface having an optical power. Letting the curved reflective surface, out of said at least one curved reflective surface, having the largest effective optical region be the largest curved reflective surface, the reflective surface other than the largest curved reflective surface is slightly decentered with the largest curved reflective surface kept in a fixed state so as to perform pixel shift on the screen surface in a vertical direction, or a horizontal direction, or an oblique direction, or vertical and horizontal directions within the range of a pixel pitch.

According to another aspect of the invention, an image projection apparatus includes: a display device; and a projection optical system for obliquely performing enlargement projection of an image formed on a display device surface onto a screen surface. In the projection optical system, a plurality of reflective surfaces are provided, at least one of which is a curved reflective surface having an optical power. In the projection optical system, letting the curved reflective surface, out of said at least one curved reflective surface, having a largest effective optical region be the largest curved reflective surface, the reflective surface other than the largest curved reflective surface is slightly decentered with the largest curved reflective surface kept in a fixed state so as to perform pixel shift on the screen surface in a vertical direction, or a horizontal direction, or an oblique direction, or vertical and horizontal directions within a range of a pixel pitch.

BRIEF DESCRIPTION OF THE DRAWINGS

FIG. 9A to 9Y are spot diagrams on the screen surface with a third curved mirror slightly decentered in Example 1;

FIG. 12A to 12Y are spot diagrams on the screen surface with no mirrors slightly decentered in Example 2;

FIG. 13A to 13Y are spot diagrams on the screen surface with a fourth curved mirror slightly decentered in Example 2;

FIG. 14A to 14Y are spot diagrams on the screen surface with a third curved mirror slightly decentered in Example 2;

FIG. 18A to 18Y are spot diagrams on the screen surface with a fourth curved mirror slightly decentered in Example 3;

FIG. 19A to 19Y are spot diagrams on the screen surface with a third curved mirror slightly decentered in Example 3;

FIG. 22A to 22Y are spot diagrams on the screen surface with no mirrors slightly decentered in Example 4;

FIG. 25A to 25Y are spot diagrams on the screen surface with a first curved mirror slightly decentered in Example 5.

DETAILED DESCRIPTION OF PREFERRED EMBODIMENTS

Figure 1:
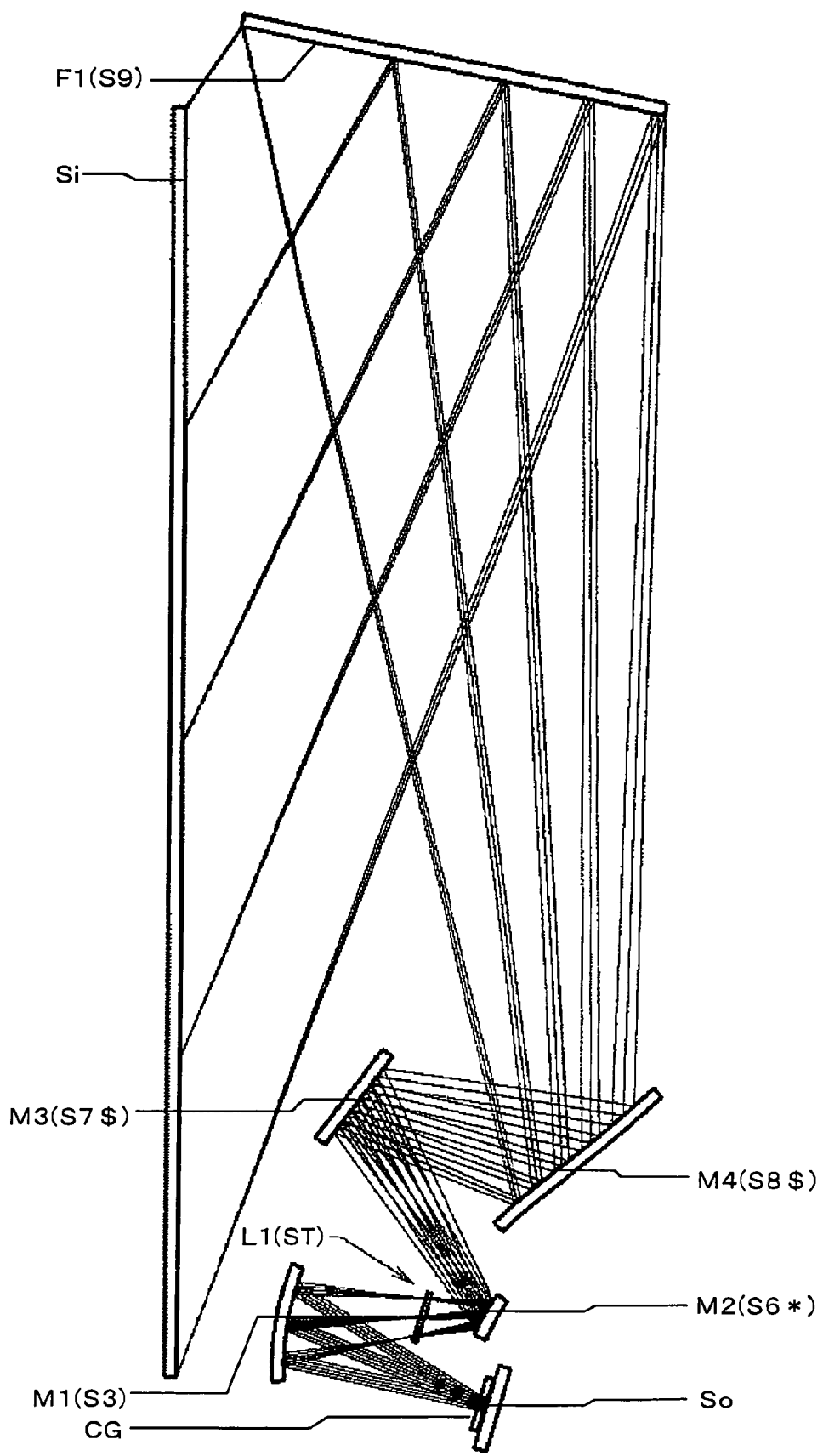
FIG. 1 is an optical path diagram showing the optical construction according to the first embodiment (Example 1) of the present invention.
Figure 2:
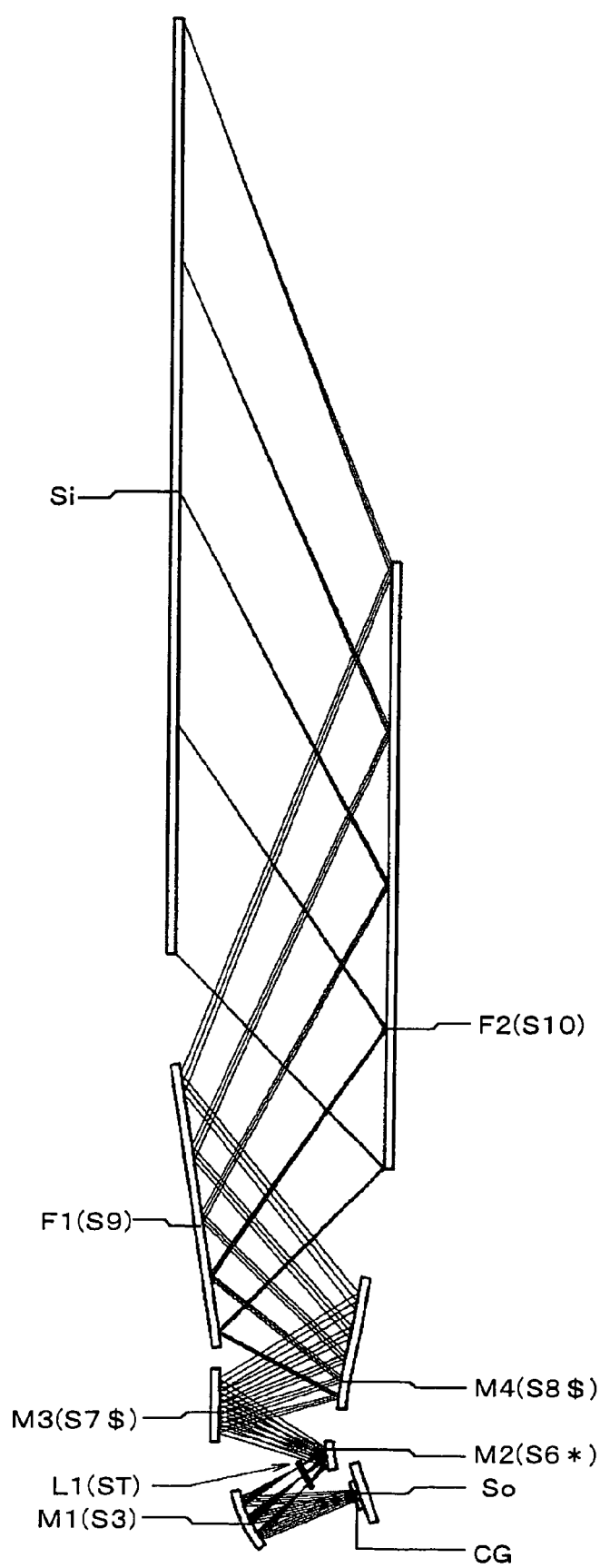
FIG. 2 is an optical path diagram showing the optical construction according to the second embodiment (Example 2) of the invention.
Figure 3:
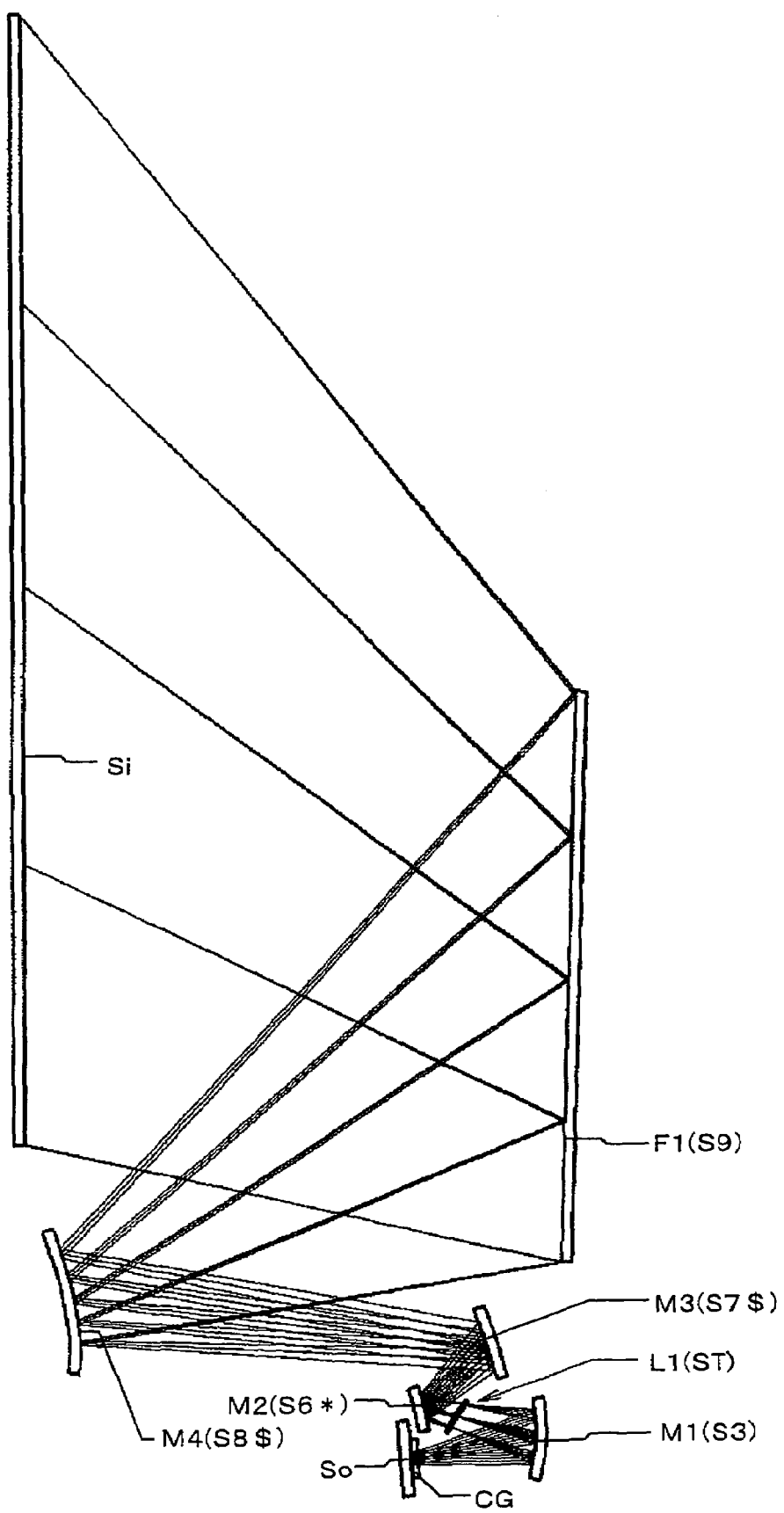
FIG. 3 is an optical path diagram showing the optical construction according to the third embodiment (Example 3) of the invention.

Embodiments of a projection optical system according to the present invention and the like will be described below, with reference to the accompanying drawings. FIGS. 1 to 5 show in optical section, the optical construction (optical arrangement, projection optical path, etc.) of the projection optical system of the invention along the entire projection optical path from a display device surface So to a screen surface Si in a first to fifth embodiments, respectively, as viewed along the longer sides of the image on the display device surface So. That is, in the rectangular coordinate system (x, y, z) established so that the x-axis runs normal to the display device surface So, that the y-axis runs along the shorter sides of the image on the display device surface So, and that the z-axis runs along the longer sides of the image on the display device surface So, FIGS. 1 to 5 show the optical construction along the entire projection optical path in the first to fifth embodiments, respectively, as viewed on the xy-section. In FIGS. 1 to 5, a reflective surface marked with an asterisk "*" is a rotation-symmetric aspherical surface, and a reflective surface marked with a dollar sign "$" is a rotation-asymmetric aspherical surface (so-called free curved surface).

In the first to fifth embodiments, the projection optical system is designed to obliquely perform enlargement projection of an image formed on the display device surface So onto the screen surface Si and thus for use in an image projection apparatus. Accordingly, the display device surface So corresponds to the image formation surface of a display device that forms a two-dimensional image by modulating the intensity of light or otherwise, and the screen surface Si corresponds to the image projection surface thereof. A two-dimensional image formed on the display device surface So is composed of a plurality of pixels; therefore, a two-dimensional image composed of a plurality of pixels corresponding thereto is enlarged and projected onto the screen surface Si. Near the display device surface So, a cover glass CG of the display device is disposed. In the first to fifth embodiments, a digital micromirror device is assumed to be used as the display device. It should be understood, however, that the display device is not limited to a digital micromirror device, but may be any other kind of non-luminous, reflective (or transmissive) display device (for example, a liquid crystal display device) that suits the projection optical system of each embodiment. In a case where a digital micromirror device is used as the display device, the light incident thereon is reflected by individual micromirrors, each either in an ON or OFF state (for example, inclined at ±12°), so that the intensity of the light is spatially modulated. As a result, only the light reflected by the micromirrors in the ON state enters the projection optical system so as to be projected onto the screen surface Si. As the display device above, a self-luminous display device may be used. When a self-luminous display device is used as the picture display device, there is no need to provide a light source and the like for illumination, and therefore it is possible to make the optical construction more lightweight and compact.

It should be understood that the optical construction of each of the first to fifth embodiments does not necessarily have to be designed exactly as shown in FIGS. 1 to 5, but may be inverted upside down. That is, designing any of the constructions shown in FIGS. 1 to 5 upside down to suit the actual apparatus arrangement, optical system arrangement, etc. causes no problem whatsoever. In the first to fifth embodiments, the projection optical system, which is optically so constructed as to perform enlargement projection obliquely from the display device surface So on the reduction side onto the screen surface Si on the enlargement side and thus be suitable for use in a rear-projection-type image projection apparatus (rear projector), may also be used, as an oblique projection optical system that performs reduced projection obliquely from the screen surface Si to the display device surface So, for an image reading apparatus. In that case, the display device surface So corresponds to the photoreceptive surface of a photoreceptive device (for example, a CCD (charge-coupled device)) for reading an image, and the screen surface Si corresponds to the surface of an image (for example, a document) to be read. In the first to fifth embodiments, the reflective surface that light passes immediately before reaching the screen surface Si on the enlargement side is a flat reflective surface. A first flat mirror F1 or a second flat mirror F2 (second flat mirror F2, and further the first flat mirror F1 in the second embodiment) on which this reflective surface is formed may be removed, and a screen may be placed at the resulting new position of the screen surface Si (that is, the mirror image position of the screen surface Si with respect to the flat reflective surface). This makes the projection optical system usable in a front-projection-type image projection apparatus (front projector), which can also be used as a reduction optical system in such an embodiment.

In the first to fifth embodiments, both a reflective optical element and a transmissive optical element are used. Used as a reflective optical element is a curved mirror having a curved reflective surface and a flat mirror having a flat reflective surface. A reflective optical element used is not limited to a mirror, but may be, for example, a kind of prism having a curved or flat reflective surface. Moreover, one or more reflective optical elements each having a plurality of reflective surfaces may be used, and an optical element having a reflective surface, refractive surface, or diffractive surface, or a combination thereof may be used. Used as a transmissive optical element is a refractive lens having a curved refractive surface. A transmissive optical element used is not limited to a refractive lens that deflects the light incident thereon by refraction (that is, one that deflects light at the interface between two media having different refractive indices), but may be a diffractive lens that deflects the light incident thereon by diffraction, a refractive/diffractive hybrid lens that deflects the light incident thereon by the combined effect of diffraction and refraction, a gradient-index lens that deflects the light incident thereon through varying refractive indices distributed within a medium, or the like. Now, the optical construction of each of the first to fifth embodiments will be described in more detail below.

The first embodiment (FIG. 1) provides a projection optical system of a four-curved-mirror type that has, as reflective curved surfaces, four surfaces: in order from the enlargement side, a rotation-asymmetric free curved surface, a rotation-asymmetric free curved surface; rotation-symmetric aspherical surface, and a spherical surface. In the first embodiment, arranged in order along the projection optical path from the display device surface So to the screen surface Si are: a cover glass CG; a first curved mirror M1 having a curved reflective surface S3 formed with a spherical surface; a substantially non-power rotation-symmetric aspherical surface lens L1 whose reduction side surface is formed with a rotation-symmetric aspherical surface composing an aperture stop ST and whose enlargement side surface is formed with a flat surface; a second curved mirror M2 having a curved reflective surface S6 formed with a rotation-symmetric aspherical surface; a third curved mirror M3 having a curved reflective surface S7 formed with a rotation-asymmetric free curved surface; a fourth curved mirror M4 having a curved reflective surface S8 formed with a rotation-asymmetric free curved surface; and a first flat mirror F1 having a flat reflective surface S9 for bending an optical path.

The second embodiment (FIG. 2) provides a projection optical system of a four-curved-mirror type that has, as reflective curved surfaces, four surfaces: in order from the enlargement side, a rotation-asymmetric free curved surface, a rotation-asymmetric free curved surface; rotation-symmetric aspherical surface, and a spherical surface. In the second embodiment, arranged in order along the projection optical path from the display device surface So to the screen surface Si are: a cover glass CG; a first curved mirror M1 having a curved reflective surface S3 formed with a spherical surface; a substantially non-power rotation-asymmetric free curved surface lens L1 whose reduction side surface S4 is formed with a rotation-asymmetric free curved surface composing an aperture stop ST and whose enlargement side surface S5 is formed with a flat surface; a second curved mirror M2 having a curved reflective surface S6 formed with a rotation-symmetric aspherical surface; a third curved mirror M3 having a curved reflective surface S7 formed with a rotation-asymmetric free curved surface; a fourth curved mirror M4 having a curved reflective surface S8 formed with a rotation-asymmetric free curved surface; a first flat mirror F1 having a flat reflective surface S9 for bending an optical path; and a second flat mirror F2 having a flat reflective surface S10 for bending an optical path.

The third embodiment (FIG. 3) provides a projection optical system of a four-curved-mirror type that has, as reflective curved surfaces, four surfaces: in order from the enlargement side, a rotation-asymmetric free curved surface, a rotation-asymmetric free curved surface; rotation-symmetric aspherical surface, and a spherical surface. In the third embodiment, arranged in order along the projection optical path from the display device surface So to the screen surface Si are: a cover glass CG; a first curved mirror M1 having a curved reflective surface S3 formed with a spherical surface; a substantially non-power rotation-asymmetric free curved surface lens L1 whose reduction side surface S4 is formed with a rotation-asymmetric free curved surface composing an aperture stop ST and whose enlargement side surface S5 is formed with a flat surface; a second curved mirror M2 having a curved reflective surface S6 formed with a rotation-symmetric aspherical surface; a third curved mirror M3 having a curved reflective surface S7 formed with a rotation-asymmetric free curved surface; a fourth curved mirror M4 having a curved reflective surface S8 formed with a rotation-asymmetric free curved surface; and a first flat mirror F1 having a flat reflective surface S9 for bending an optical path.

Figure 4:
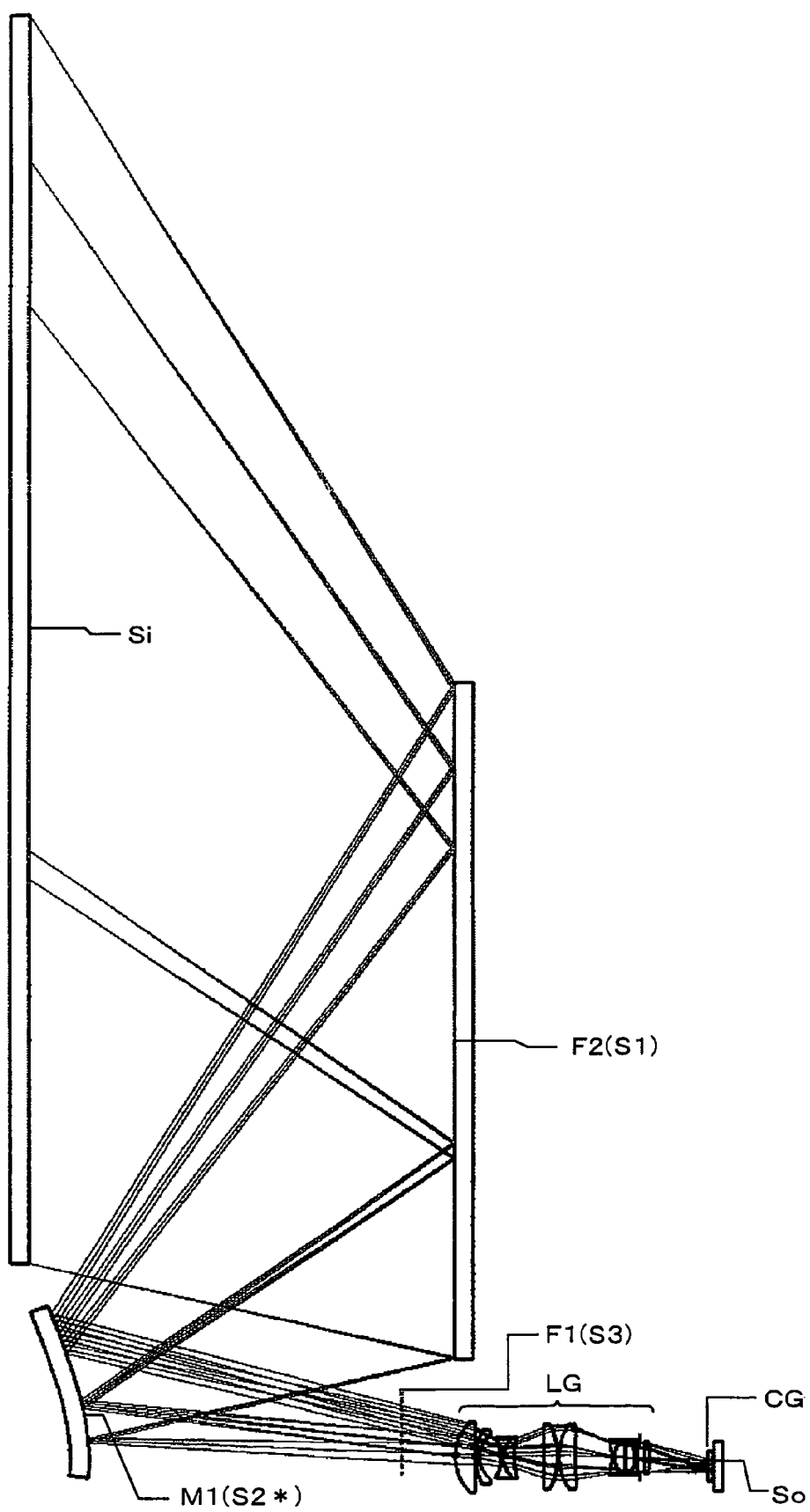
FIG. 4 is an optical path diagram showing the optical construction according to the fourth embodiment (Example 4) of the invention.
Figure 5:
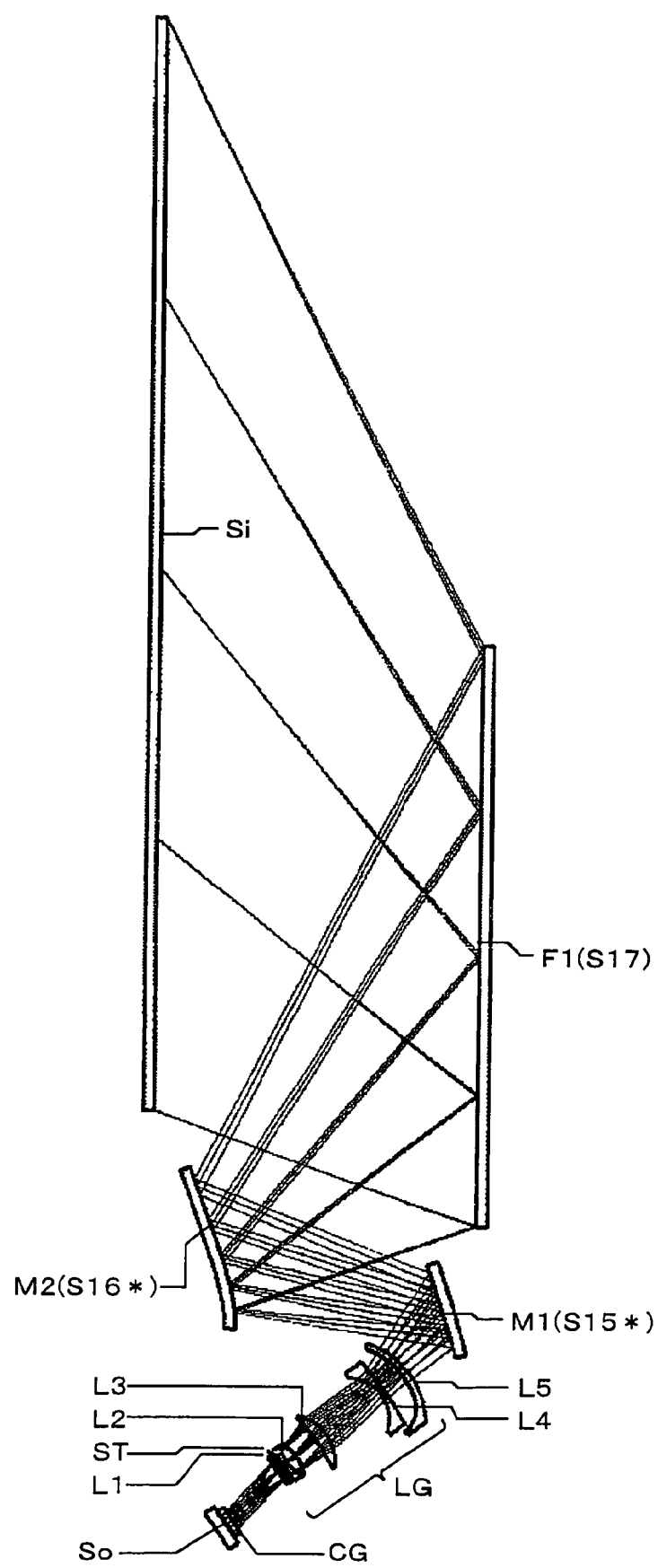
FIG. 5 is an optical path diagram showing the optical construction according to the fifth embodiment (Example 5) of the invention.
Figure 6:
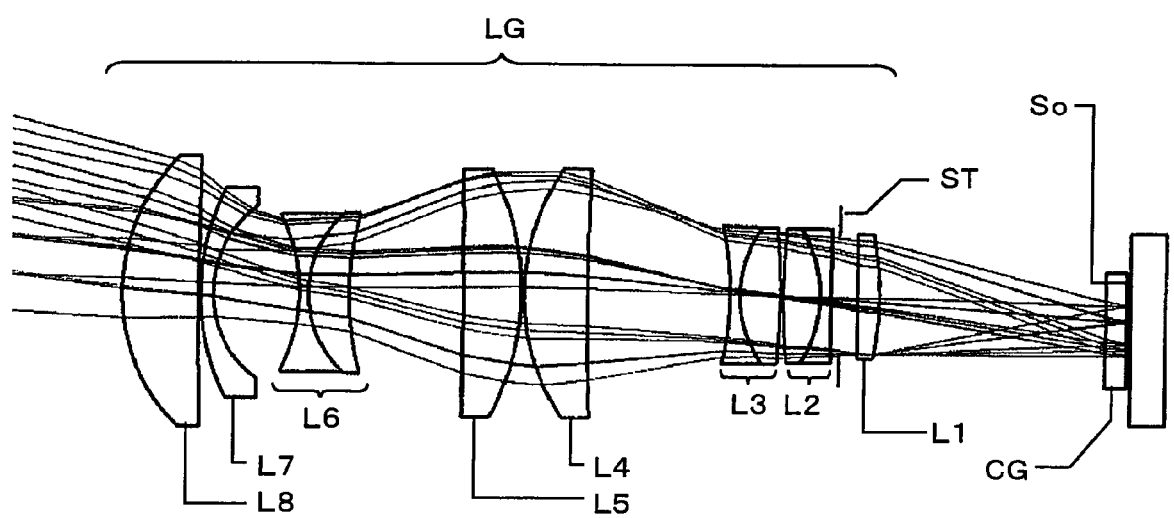
FIG. 6 is an enlarged view of the principal part of FIG. 4.

The fourth embodiment (FIG. 4) provides a projection optical system of an one-curved-mirror type that has, as a reflective curved surface, only one rotation-symmetric aspherical surface. In the fourth embodiment, arranged in order along the projection optical path from the display device surface So to the screen surface Si are: a cover glass CG; a refractive optical system LG; a first flat mirror F1 having a flat reflective surface S3 for bending an optical path; a first curved mirror M1 having a curved reflective surface S2 formed with a rotation-symmetric aspherical surface; and a second flat mirror F2 having a flat reflective surface S1 for bending an optical path. FIG. 4 shows the optical path being expanded with the first flat mirror F1, that is, being bent by the first flat mirror F1, with the display device surface So oriented vertically to the screen surface Si. Owing to the bending by the first flat mirror F1 the refractive optical system does not protrude toward the rear side of the projector, thus permitting the slimming-down of the rear projector. FIG. 6 shows the optical construction of the refractive optical system LG on an enlarged scale. The refractive optical system LG is composed of: in order from the reduction side, a positive lens L1 whose reduction side surface is formed with a rotation-symmetric aspherical surface; an aperture stop ST; two cemented lenses L2 and L3; two positive lenses L4 and L5; a cemented lens L6; a negative lens L7; and a positive lens S8.

The fifth embodiment (FIG. 5) provides a projection optical system of a two-curved-mirror type that has, as reflective curved surface, only two rotation-symmetric aspherical surfaces. In the fifth embodiment, arranged in order along the projection optical path from the display device surface So to the screen surface Si are: a cover glass CG; a refractive optical system LG; a first curved mirror M1 having a curved reflective surface S15 formed with a rotation-symmetric aspherical surface; a second curved mirror M2 having a curved reflective surface S16 formed with a rotation-symmetric aspherical surface; and a first flat mirror F1 having a flat reflective surface S17 for bending the optical path. The refractive optical system LG is composed of: in order from the reduction side, a substantially non-power rotation-symmetric aspherical surface lens L1 whose reduction side surface is formed with a rotation-symmetric aspherical surface and whose enlargement side surface is formed with a flat surface; an aperture stop ST; a cemented lens L2; a positive lens L3; a negative lens L4; and a substantially non-power rotation-asymmetric free curved lens L5 whose reduction side surface is formed with a rotation-asymmetric free curved surface.

As described above, the practice of pixel shift causes pixels to be superimposed on one another due to after-image effect, which makes the contour of the pixels projected on the screen surface less outstanding, thereby permitting the display of a smooth image. Moreover, due to its ability to increase the volume of information displayed on the screen surface without changing the number of pixels of the display device, the pixel shift is very effective in achieving a higher-grade image through an improvement in the resolution (that is, apparent increase in the number of pixels). More specifically, pixels projected on the screen are slightly shifted at regular intervals such that the amount of this shift becomes less than the pixel pitch (form example, one haft of the pixel size). This interval may be any length, for example, 1/30 seconds or 1/60 seconds as a typical frame rate of a moving image, as long as it permits occurrence of after-image phenomena. The orbit of pixels on the screen may be linear in a reciprocating manner, circular, quadrangular, or the like. On the display device, an image is formed in correspondence with the pixel shift position. This image in turn is projected onto the screen by the projection optical system, thereby achieving an improvement in the resolution. To perform such pixel shift, adding to the projection optical system an optical component having no optical power for image projection causes an increase in the number of components, an increase in the back focus, and the like, which leads to upsizing of the entire apparatus and a cost increase. Moreover, the construction such that a refractive surface is decentered suffers from chromatic aberration, and the like.

Thus, each of the embodiments employs the construction such that pixel shift is performed with a reflective surface that is provided for image projection. In a case where a mirror to be slightly decentered is large in size, this results in upsizing and complication of mechanisms, such as a mirror holding mechanism, a mirror decentering mechanism, and the like. Therefore, it is preferable that a mirror to be slightly decentered be as small as possible and that a mirror at least other than the largest curved mirror be slightly decentered. Therefore, it is desirable that the projection optical system have a plurality of reflective surfaces, at least one of which is a curved reflective surface having an optical power, and that, assuming that the curved reflective surface of those descried above that has the largest effective optical region is the largest curved reflective surface, pixel shift be performed on the screen surface in the vertical direction, or the horizontal direction, or the oblique (for example, a direction along a screen diagonal line) direction, or the vertical and horizontal directions within the range of a pixel pitch by slightly decentering the reflective surface other than the largest curved reflective surface while the largest curved reflective surface is kept in a fixed state.

According to the construction such that a reflective surface other than the largest curved reflective surface which is kept in a fixed state is slightly decentered, a reflective optical element having a large reflective surface size and a heavy weight no longer have to be decentered. This permits downsizing of the mechanisms such as the holding mechanism, the decentering mechanism, and the like of the reflective optical element. Moreover, considering the sensitivity of a reflective surface, the construction such that a reflective surface other than the largest curved reflective surface is slightly decentered can improve the accuracy in the amount of pixel shift achieved by slight decentering. Furthermore, no additional new optical member is required for pixel shift; therefore, the number of components required is smaller compared to the construction such that image projection is achieved by use of the optical power of a refractive optical system, thus providing a low-cost projection optical system. Thus, in the low-cost, compact projection optical system, pixel shift can be achieved with a high accuracy while maintaining a favorable optical performance. As a result, this effective pixel shift makes the contour of pixels projected on the screen surface less outstanding, thereby permitting the display of a smooth image and also more stably achieving a higher-grade image through an improvement in the resolution. The use of this projection optical system in an image projection apparatus, such as a rear projector, a front projector, or the like, can largely contribute to slimming-down, weight-saving, downsizing, cost reduction, performance enhancement, function enhancement, and the like of this apparatus.

As described in the embodiments, it is preferable that a reflective surface (curved reflective surface or flat reflective surface) in contact with air be slightly decentered. That is, it is preferable that a curved mirror having a curved reflective surface in contact with air or a flat mirror having a flat reflective surface in contact with air be slightly decentered. Reflective optical elements whose reflective surface is not in contact with air include an inner reflective prism that reflects light thereinside. Slightly decentering the inner reflective prism to slightly decenter the reflective surface that reflects light inside the prism results in slightly decentering a refractive surface (for example, a light entrance-side surface or light exit-side surface) included in the inner reflective prism. The slight decentering of a refractive surface in contact with air causes chromatic aberration, which does not occur by the slight decentering of a reflective surface in contact with air. Therefore, it is preferable that a curved mirror having a curved reflective surface in contact with air, a flat mirror having a flat reflective surface in contact with air, or a front surface reflective prism having a reflective surface (curved reflective surface or flat reflective surface) in contact with air (i.e., a prism that reflects light with its front surface as a reflective surface without making the light enter therein) be used as a reflective optical element to be slightly decentered.

Assuming that a reflective surface to be slightly decentered for performing the pixel shift is a slightly decentered reflective surface, it is desirable that the slightly decentered reflective surface be arranged next to the aforementioned largest curved reflective surface on the reduction side thereof. For example, in the first to third embodiments, it is preferable that the curved reflective surface S7 of the third curved mirror M3 be provided as the slightly decentered reflective surface. In the fourth embodiment, it is preferable that the flat reflective surface S3 of the first flat mirror F1 be provided as the slightly decentered reflective surface. In the fifth embodiment, it is preferable that the curved reflective surface S15 of the first curved mirror M1 be provided as the slightly decentered reflective surface. If a reflective surface arranged in the refractive optical system is slightly decentered, chromatic aberration results, which leads to performance degradation. If the refractive optical system is not arranged between the largest curved reflective surface and the slightly decentered reflective surface, chromatic aberration and thus performance degradation hardly occur. Moreover, this alleviates the condition of interference of the slightly decentered reflective surface with a reflective surface arranged thereabove or therebelow, the screen, or a back mirror, thereby permitting a greater degree of freedom in the arrangement of the mechanisms.

Bending the optical path with a flat reflective surface is effective in achieving downsizing of an entire projection optical system. In the fourth embodiment (FIG. 4), in order to avoid the protrusion of the refractive optical system toward the projector rear side, the optical path is bent by the first flat mirror F1 to be slightly decentered so that the display device surface So is oriented perpendicularly to the screen surface Si. From this viewpoint, assuming that a ray exiting from the image center of the display device surface and passing through the center of the aperture stop is a basic ray, it is preferable that a plane including an incidence ray and a reflecting ray formed by the basic ray with respect to the slightly decentered reflective surface and a plane including an incidence ray and a reflecting ray formed by the basic ray with respect to the largest curved reflective surface be orthogonal to each other. Thus, such an arrangement of the slightly decentered reflective surface and the largest curved reflective surface permits slimming-down of the projection optical system in the anteroposterior direction. Moreover, the optical arrangement such that a plane including an incidence ray and a reflecting ray formed by the basic ray with respect to the slightly decentered reflective surface and a plane including an incidence ray and a reflecting ray formed by the basic ray with respect to the largest curved reflective surface are orthogonal to each other is even more effective when the slightly decentered reflective surface is arranged next to the largest curved reflective surface on the reduction side thereof.

From another viewpoint, a plane including an incidence ray and a reflecting ray formed by the basic ray with respect to the slightly decentered reflective surface and a plane including an incidence ray and a reflecting ray formed by the basic ray with respect to the largest curved reflective surface are on the same plane. Such an arrangement of the slightly decentered reflective surface and the largest curved reflective surface permits a thinner thickness of the projection optical system than that of a coaxial refractive optical system. In the first to third and fifth embodiments, the slightly decentered reflective surface and the largest curved reflective surface are provided in this arrangement.

It is preferable that at least one curved reflective surface be arranged between the largest curved reflective surface and the slightly decentered reflective surface. For example, in the first to third embodiments, since the curved reflective surface S8 of the fourth curved mirror M4 is the largest curved reflective surface, it is preferable that the curved reflective surface S3 of the first curved mirror M1 or the curved reflective surface S6 of the second curved mirror M2 be the slightly decentered reflective surface. Such an arrangement of the curved reflective surface between the largest curved reflective surface and the slightly decentered reflective surface results in the arrangement of the slightly decentered reflective surface located closer to the display device surface side. As a result, the sensitivity of the slightly decentered reflective surface improves, thus permitting pixel shift with a better accuracy over the entire screen. Moreover, in arranging the curved reflective surface between the largest curved reflective surface and the slightly decentered reflective surface, using a curved reflective surface as the slightly decentered reflective surface can further improve the effect described above.

In the construction such that at least one curved reflective surface is arranged between the largest curved reflective surface and the slightly decentered reflective surface, it is preferable that the aperture stop and the slightly decentered reflective surface be arranged in this order from the reduction side. For example, in the first to third embodiments, it is preferable that the curved reflective surface S6 of the second curved mirror M2 located to the enlargement side of the aperture stop ST be provided as the slightly decentered reflective surface. Such an arrangement locates the reflective surface to be slightly decentered immediately above the display device surface. As a result, the condition of interference between the display device surface and the slightly decentered reflective surface becomes tight, thus resulting in a smaller degree of freedom in the arrangement of the mechanisms. However, the mirror size of the slightly decentered reflective surface can also be minimized, and the mechanisms can also be minimized, thus further permitting pixel shift with an even better accuracy.

In the construction such that at least one curved reflective surface is arranged between the largest curved reflective surface and the slightly decentered reflective surface, it is preferable that the slightly decentered reflective surface and the aperture stop be arranged in this order from the reduction side. For example, in the first to third embodiments, it is preferable that the curved reflective surface S3 of the first curved mirror M1 located to the reduction side of the aperture stop ST be provided as the slightly decentered reflective surface. Such an arrangement results in a larger reflective surface size and a slightly larger mechanical construction compared to the arrangement of the aperture stop and the slightly decentered reflective surface placed in this order from the reduction side. However, this arrangement alleviates the condition of interference between the slightly decentered reflective surface and the reflective surface arranged immediately thereabove, thus permitting a greater degree of freedom in the arrangement of the mechanisms and pixel shift with an even better accuracy.

As in the first to third embodiments, it is preferable that at least four curved reflective surfaces be provided. Providing at least four curved reflective surfaces can ensure a sufficiently favorable optical performance in a wide-angle projection optical system. Providing three or less curved reflective surfaces makes it extremely difficult in terms of design and manufacture to provide an optical performance required as the projection optical system. However, note that the smaller number of optical surfaces is preferable in terms of costs and that an increase in the number of optical surfaces also brings disadvantages in the arrangement of optical elements in the housing. Therefore, it is further preferable that four surfaces in total be provided as curved reflective surfaces. Even with four curved reflective surfaces, a satisfactorily favorable optical performance can be ensured when these surfaces are used in a wide-angle oblique projection optical system.

According to the present invention, pixel shift is performed by slightly decentering a reflective surface other than the largest curved reflective surface that is kept in a fixed state. Thus, in the low-cost, compact projection optical system, pixel shift can be achieved with a high accuracy while maintaining a favorable optical performance. As a result, this effective pixel shift makes the contour of pixels projected on the screen surface less outstanding, thereby permitting the display of a smooth image and also more stably achieving a higher-grade image through an improvement in the resolution. Therefore, the use of the projection optical system according to the invention in an image projection apparatus, such as a rear projector, a front projector, or the like, can largely contribute to slimming-down, weight-saving, downsizing, cost reduction, performance enhancement, function enhancement, and the like of this apparatus.

EXAMPLES

Hereinafter, practical examples of the projection optical system embodying the present invention will be presented with reference to their construction data and the like. Examples 1 to 5 presented below are numerical examples of projection optical systems corresponding to the first to fifth embodiments, respectively, described previously. Thus, the optical construction diagrams (FIGS. 1 to 6) showing the first to fifth embodiments also show the optical arrangement, projection optical path, and other features of Examples 1 to 5, respectively. The construction data of each example shows the optical arrangement through the entire system starting with the display device surface So on the reduction side (corresponding to the object surface in enlargement projection) to the screen image surface Si on the enlargement side (corresponding to the image surface in enlargement projection). The n-th surface counted from the reduction side (in Examples 1 to 3 and 5) or the enlargement side (in Example 4) is represented by Sn (n=1, 2, 3, . . . ). It should be noted that the surfaces S1 and S2 in Examples 1 to 3 and 5 and the surfaces S27 and S28 in Example 4 respectively correspond to both side surfaces of the cover glass CG that covers the display device surface So to protect it, and thus do not constitute part of the projection optical system.

How each optical surface is arranged is represented by the coordinates (x, y, z) (mm), as measured in a global rectangular coordinate system (x, y, z), of the origin (0) and the coordinate axis vectors (VX, VY) of the local rectangular coordinate system (X, Y, Z) established with its origin (0) located at the vertex of the optical surface. Here, all the coordinate systems are defined as right-hand systems, and the global rectangular coordinate system (x, y, z) is an absolute coordinate system that coincides with the local rectangular coordinate system (X, Y, Z) established for the display device surface So. Thus, the origin (0) of the global rectangular coordinate system (x, y, z) coincides with the origin (0) located at the center of the display device surface So, the vector VX on the display device surface So is parallel to a line normal to the display device surface So, the vector VY is perpendicular to the vector VX and parallel to the shorter sides of the image on the display device surface So. For an optical surface that forms part of a coaxial system with an optical surface represented by coordinate data (x, y, z) regarded as the foremost surface, its arrangement is represented by the axial distance T' (mm) in the X direction with respect to the immediately previous optical surface. Note that, in Example 4, by omitting the bending of the optical path by the first curved mirror M1 and the first flat mirror F1, a co-axial system is shown with the optical path expanded with the first curved mirror M1 and the first flat mirror F1 and with the second flat mirror F2 regarded as the foremost surface.

The surface shape of each optical element is represented by the curvature C0 (mm$^{-1}$), the radius of curvature r (mm), etc. of the optical surface(s) it has. For example, a surface Sn marked with an asterisk (*) is a rotation-symmetric aspherical surface, whose surface shape is defined by formula (AS) below within the local rectangular coordinate system (X, Y, Z) having its origin (0) at the vertex of the surface. On the other hand, a surface Sn marked with a dollar sign ($) is a rotation-asymmetric aspherical surface (a so-called free curved surface), whose surface shape is defined by formula (BS) below within the local rectangular coordinate system (X, Y, Z) having its origin (0) at the vertex of the surface. Listed together with other data are rotation-symmetric aspherical surface data and rotation-asymmetric aspherical surface data. It should be noted that any coefficient that is not expressly shown equals zero, and that, for all data, "E−n" stands for "×10$^{-n}$".

$$X = (C0 \cdot H^2)/(1+\sqrt{1-\epsilon \cdot C0^2 \cdot H^2}) + \Sigma(A(i) \cdot H^i) \quad \text{(AS)}$$

$$X = (C0 \cdot H^2)/(1+\sqrt{1-\epsilon \cdot C0^2 \cdot H^2}) + \Sigma(G(j,k) \cdot Y^j \cdot Z^k) \quad \text{(BS)}$$

wherein
  X represents the displacement (with respect to the vertex) from the reference surface as measured in the X direction at the height H;
  H represents the height in a direction perpendicular to the X-axis (H=$\sqrt{Y^2+Z^2}$);
  C0 represents the curvature at the vertex (a positive or negative sign added with respect to the X-axis in the local rectangular coordinate system, a positive sign added when the center of the curvature lies in the positive direction on the vector VX; C0=1/r);
  $\epsilon$ represents the quadric surface parameter;
  A(i) represents the rotation-symmetric aspherical surface coefficient of order i; and
  G(j, k) represents the rotation-asymmetric aspherical surface coefficient of order j with respect to Y and order k with respect to Z.

Also listed together with other data are the refractive index N for the d-line of the medium located on the entrance side of each optical surface, the refractive index N' for the d-line of the medium located on the exit side thereof (when the optical surface in question is a reflective surface, its refractive index takes a negative value), and the Abbe number (vd) of the optical material. For an aperture stop ST (or an optical surface composing the aperture stop ST), the effective radius R thereof is listed.

In Examples 1 to 4, the dimensions (mm) of the image on the display device surface So are LY=±2.754 and LZ=±4.892. In Example 5, the dimensions (mm) of the image on the display device surface So are LY=±4.925 and LZ=±8.7552. Here, the image on the display device surface So has a rectangular shape, with LY representing the dimension of the image on the display device surface So along the shorter sides thereof (that is, in the Y direction) and LZ representing the dimension of the image on the display device surface So along the longer sides thereof (that is, in the Z direction). Magnifications (β) and F numbers (FnoY, FnoZ) in Examples 1 to 5 are also shown with FnoY representing the F number in the longitudinal direction (Y direction) and FnoZ representing the F number in the lateral direction (Z direction):

| Example 1 | β = 95.03, FnoY = 2.82, FnoZ = 2.92 |
| Example 2 | β = 95.03, FnoY = 2.71, FnoZ = 2.91 |
| Example 3 | β = 95.02, FnoY = 2.91, FnoZ = 2.79 |
| Example 4 | β = 95.03, FnoY = 2.20, FnoZ = 2.20 |
| Example 5 | β = 50.66, FnoY = 3.50, FnoZ = 3.50. |

Tables 1 to 5 show the amounts (mm) of pixel shift occurring on the screen surface Si when the mirror is slightly decentered, referring to Examples 1 to 5, respectively. Note that only one mirror (i.e., slightly decentered mirror) is slightly decentered during one pixel shift. The pixel shift is performed in the image shorter-side direction (Y direction) of the display device surface So. A half pixel on the screen surface Si is equivalent to 0.7255 mm (β=95.02) for Example 1, to 0.7255 mm (β=95.02) for Example 2, to 0.7255 mm (β=95.02) for Example 3, to 0.7255 mm (β=95.02) for Example 4, and to 0.6930 mm (β=50.66) for Example 5. The amounts of pixel shift indicated in Tables 1 to 5 refer to 13 evaluation points out of 25 evaluation points on the screen surface Si. These evaluation points are in correspondence with spot diagrams (FIGS. 7A to 7Y through 25A to 25Y) to be described later.

Rotation center coordinates of slight decentering are shown below for each mirror. In Tables 1 to 5, the amount of decentering RY represents the horizontal swing angle (minutes) and the amount of decentering RZ represents the vertical tilt angle (minutes).

[Example 1]

| | |
|---|---|
| Fourth curved mirror M4 | (x, y, z) = (−1.07349, −103.883, 0.) |
| Third curved mirror M3 | (x, y, z) = (87.5421, −104.705, 0.) |
| Second curved mirror M2 | (x, y, z) = (11.6601, −36.5344, 0.) |
| First curved mirror M1 | (x, y, z) = (89.4021, −9.25082, 0.) |

[Example 2]

| | |
|---|---|
| Fourth curved mirror M4 | (x, y, z) = (−16.4149, −75.2672, 0.) |
| Third curved mirror M3 | (x, y, z) = (60.9715, −71.0976, 0.) |
| Second curved mirror M2 | (x, y, z) = (11.3215, −26.3565, 0.) |
| First curved mirror M1 | (x, y, z) = (63.932, −6.58458, 0.) |

[Example 3]

| | |
|---|---|
| Fourth curved mirror M4 | (x, y, z) = (−153.026, −84.0553, 0.) |
| Third curved mirror M3 | (x, y, z) = (39.4729, −48.9831, 0.) |
| Second curved mirror M2 | (x, y, z) = (8.12686, −23.6118, 0.) |
| First curved mirror M1 | (x, y, z) = (58.9778, −6.09164, 0.) |

[Example 4]

| | |
|---|---|
| First flat mirror F1 | (x, y, z) = (−29.058, 0, 0.) |

[Example 5]

| | |
|---|---|
| First curved mirror M1 | (x, y, z) = (137.998328, 19.3049022, 0.) |

Figure 7A:
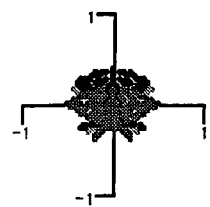
FIG. 7A to 7Y are spot diagrams on the screen surface with no mirrors slightly decentered in Example 1.
Figure 7B:
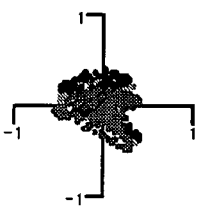
Figure 7C:
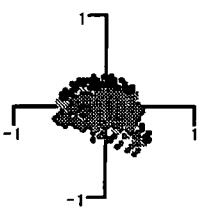
Figure 7D:
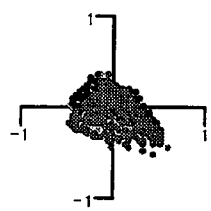
Figure 7E:
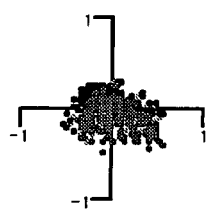
Figure 7F:
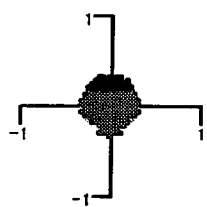
Figure 7G:
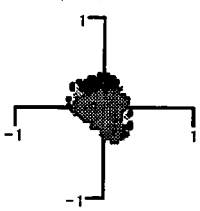
Figure 7H:
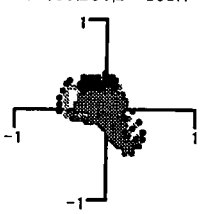
Figure 7I:
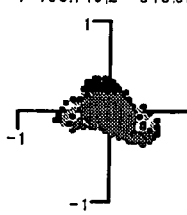
Figure 7J:
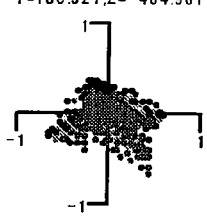
Figure 7K:
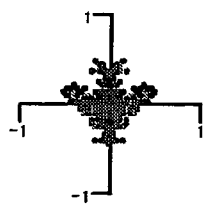
Figure 7L:
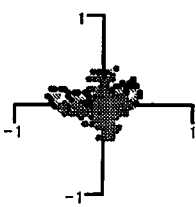
Figure 7M:
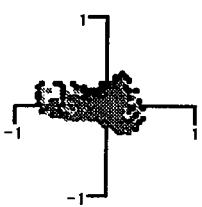
Figure 7N:
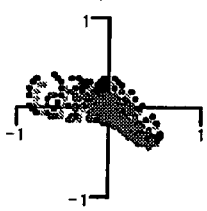
Figure 7O:
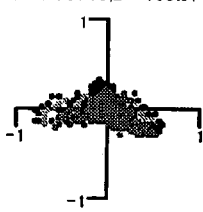
Figure 7P:
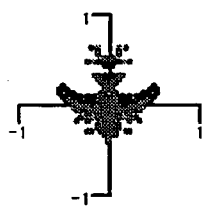
Figure 7Q:
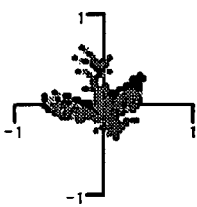
Figure 7R:
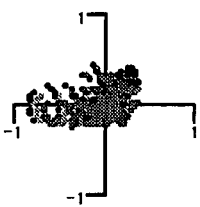
Figure 7S:
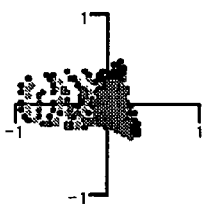
Figure 7T:
Figure 7U:
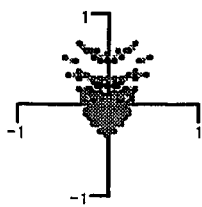
Figure 7V:
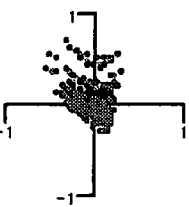
Figure 7W:
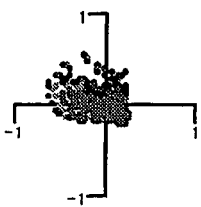
Figure 7X:
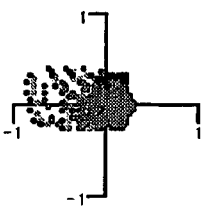
Figure 7Y:
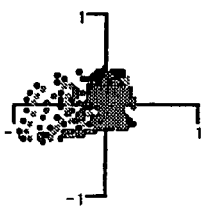
Figure 8A:
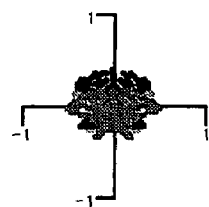
FIG. 8A to 8Y are spot diagrams on the screen surface with a fourth curved mirror slightly decentered in Example 1.
Figure 8B:
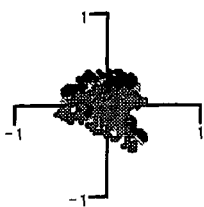
Figure 8C:
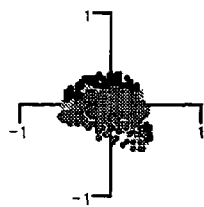
Figure 8D:
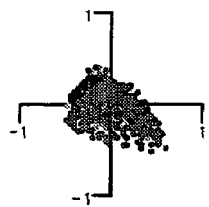
Figure 8E:
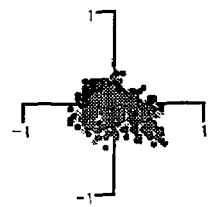
Figure 8F:
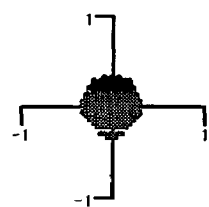
Figure 8G:
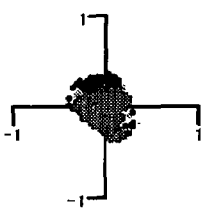
Figure 8H:
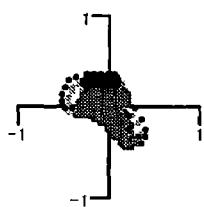
Figure 8I:
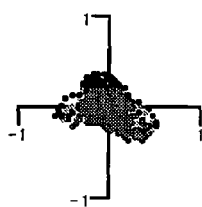
Figure 8J:
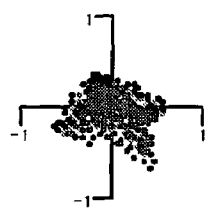
Figure 8K:
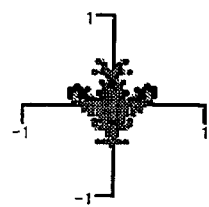
Figure 8L:
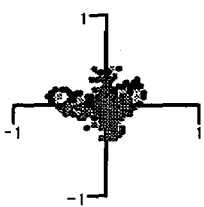
Figure 8M:
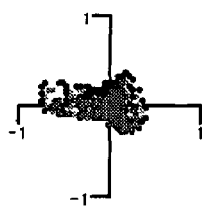
Figure 8N:
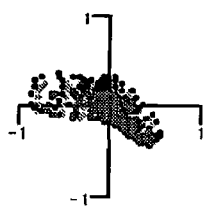
Figure 8O:
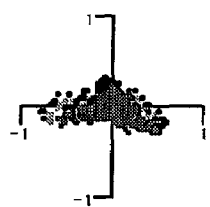
Figure 8P:
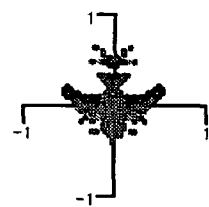
Figure 8Q:
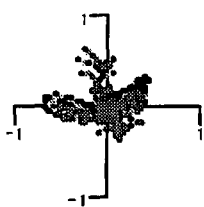
Figure 8R:
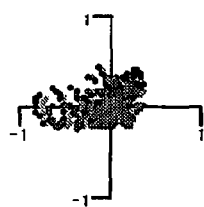
Figure 8S:
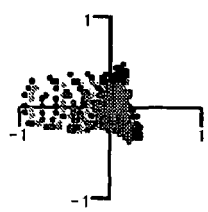
Figure 8T:
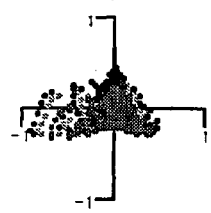
Figure 8U:
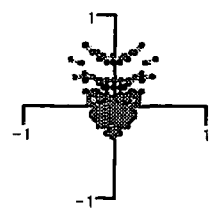
Figure 8V:
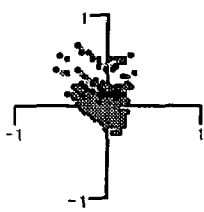
Figure 8W:
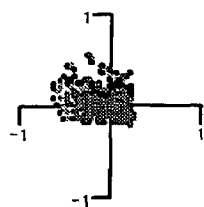
Figure 8X:
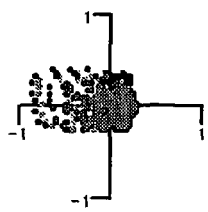
Figure 8Y:
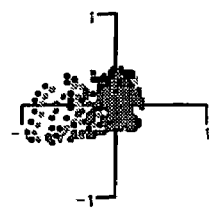
Figures 10A, 10B, 10C, 10D, 10E:
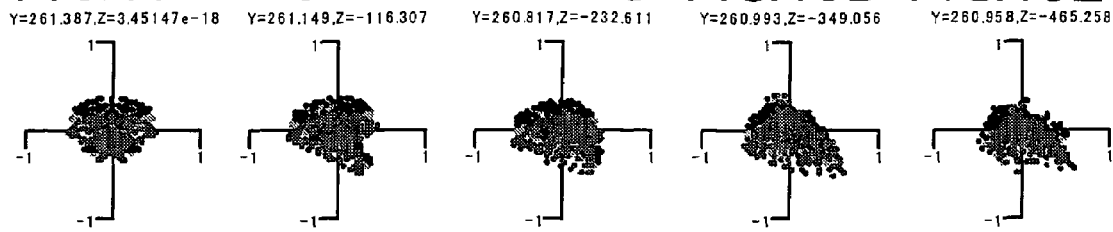
FIG. 10A to 10Y are spot diagrams on the screen surface with a second curved mirror slightly decentered in Example 1.
Figures 10F, 10G, 10H, 10I, 10J:
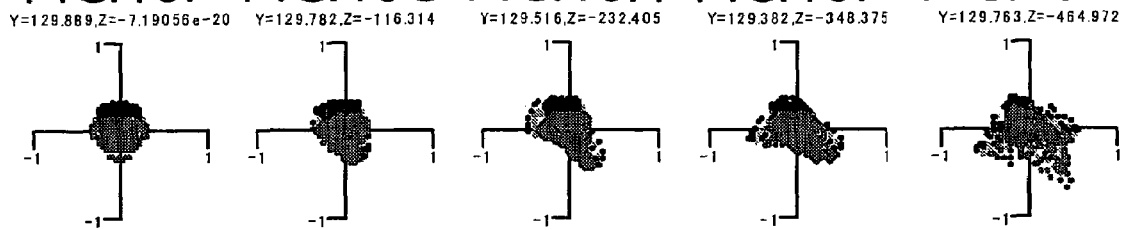
Figures 10K, 10L, 10M, 10N, 10O:
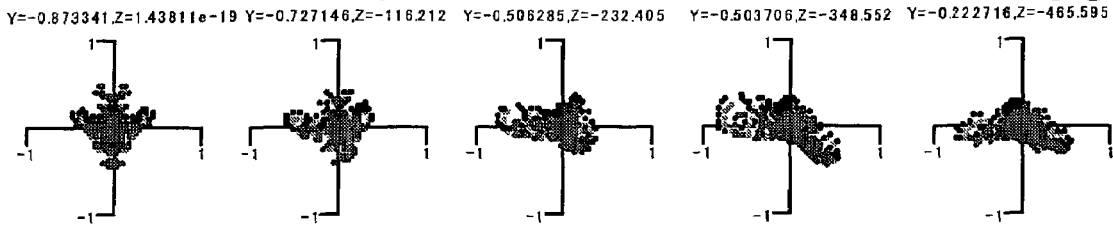
Figures 10P, 10Q, 10R, 10S, 10T:
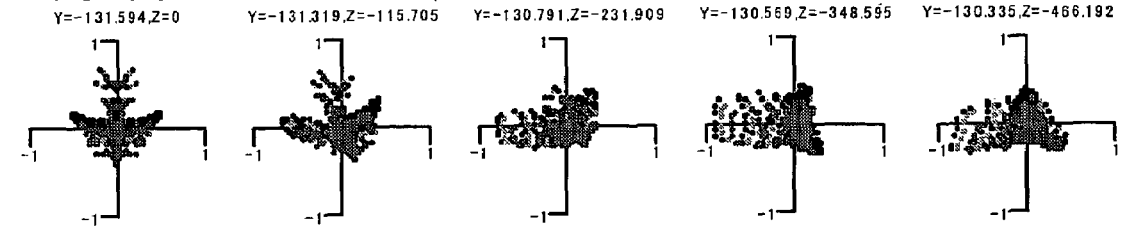
Figures 10U, 10V, 10W, 10X, 10Y:
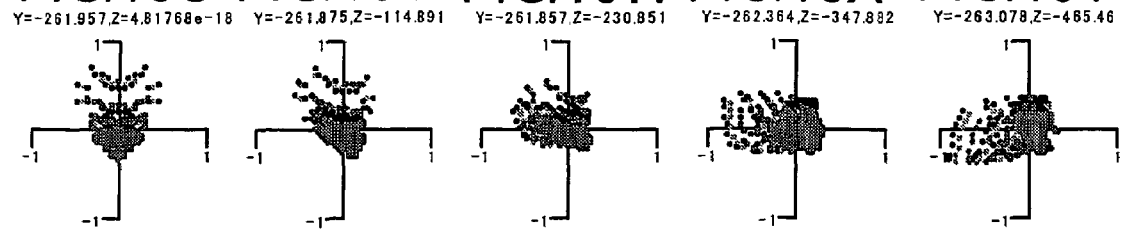
Figure 11A:
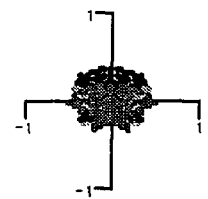
FIG. 11A to 11Y are spot diagrams on the screen surface with a first curved mirror slightly decentered in Example 1.
Figure 11B:
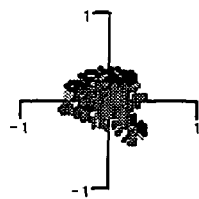
Figure 11C:
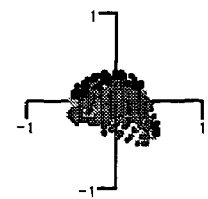
Figure 11D:
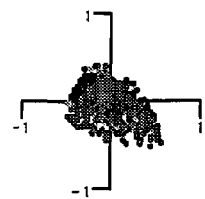
Figure 11E:
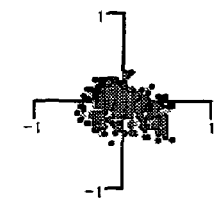
Figure 11F:
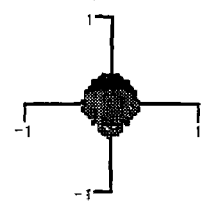
Figure 11G:
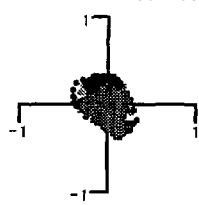
Figure 11H:
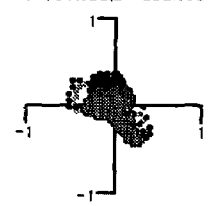
Figure 11I:
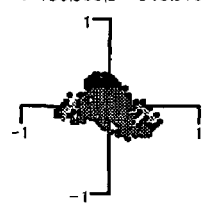
Figure 11J:
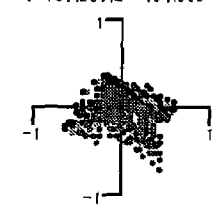
Figure 11K:
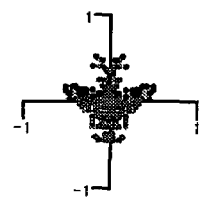
Figure 11L:
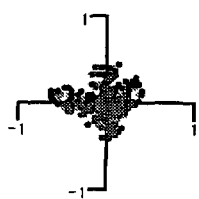
Figure 11M:
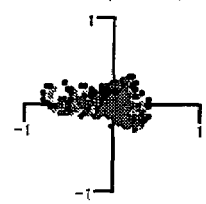
Figure 11N:
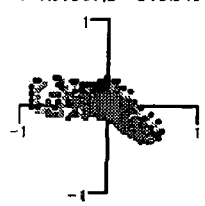
Figure 11O:
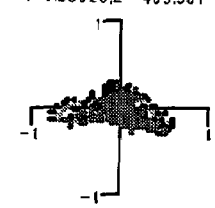
Figure 11P:
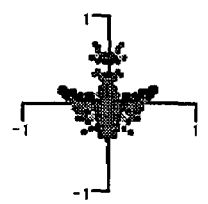
Figure 11Q:
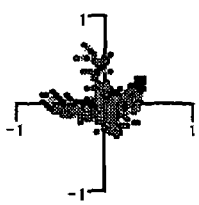
Figure 11R:
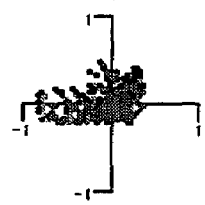
Figure 11S:
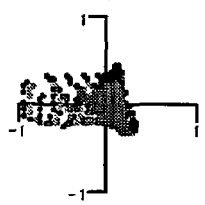
Figure 11T:
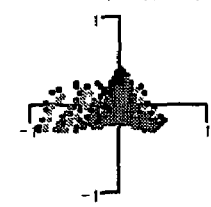
Figure 11U:
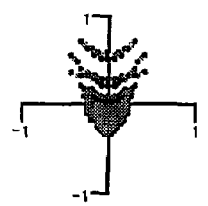
Figure 11V:
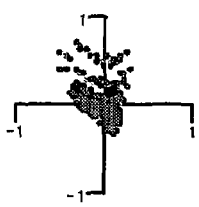
Figure 11W:
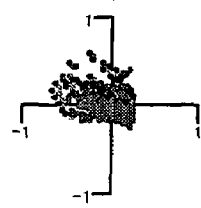
Figure 11X:
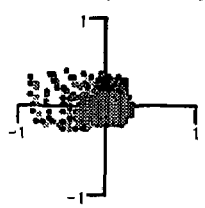
Figure 11Y:
Figures 15A, 15B, 15C, 15D, 15E:
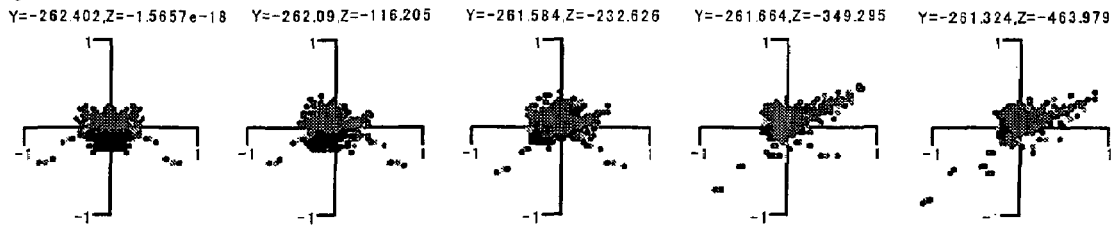
FIG. 15A to 15Y are spot diagrams on the screen surface with a second curved mirror slightly decentered in Example 2.
Figures 15F, 15G, 15H, 15I, 15J:
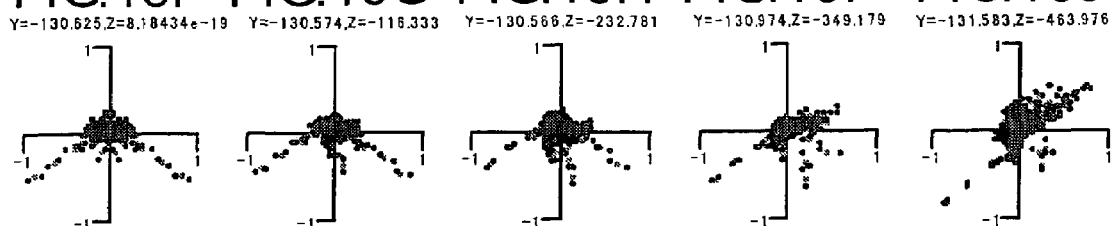
Figures 15K, 15L, 15M, 15N, 15O:
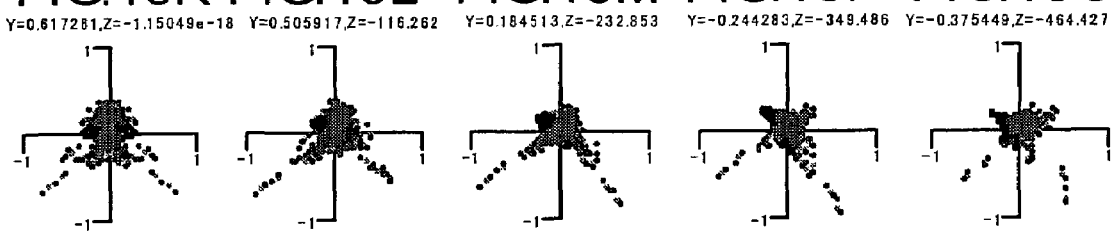
Figures 15P, 15Q, 15R, 15S, 15T:
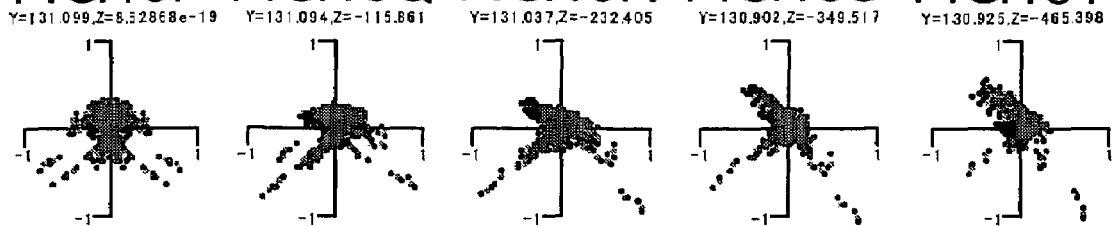
Figures 15U, 15V, 15W, 15X, 15Y:
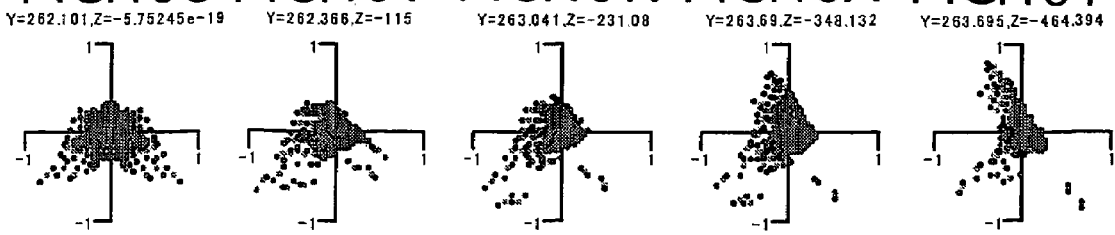
Figures 16A, 16B, 16C, 16D, 16E:
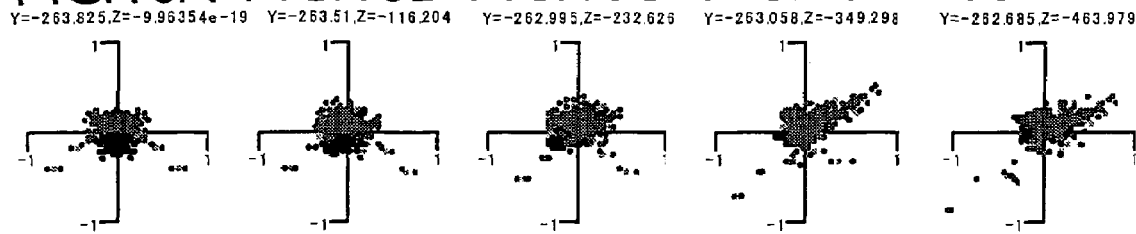
FIG. 16A to 16Y are spot diagrams on the screen surface with a first curved mirror slightly decentered in Example 2.
Figures 16F, 16G, 16H, 16I, 16J:
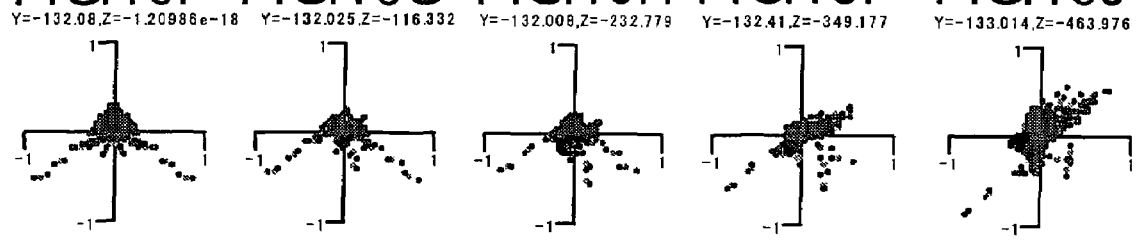
Figures 16K, 16L, 16M, 16N, 16O:
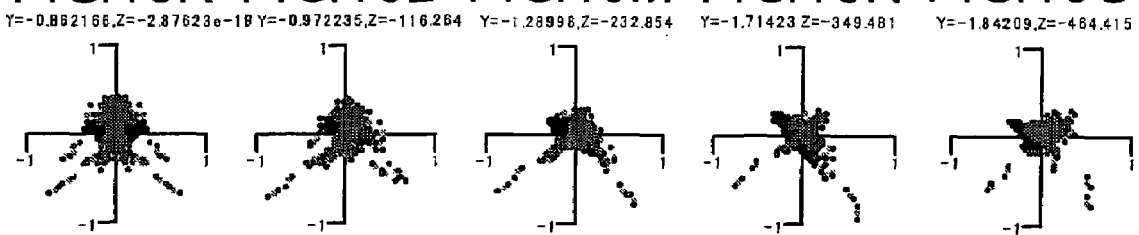
Figures 16P, 16Q, 16R, 16S, 16T:
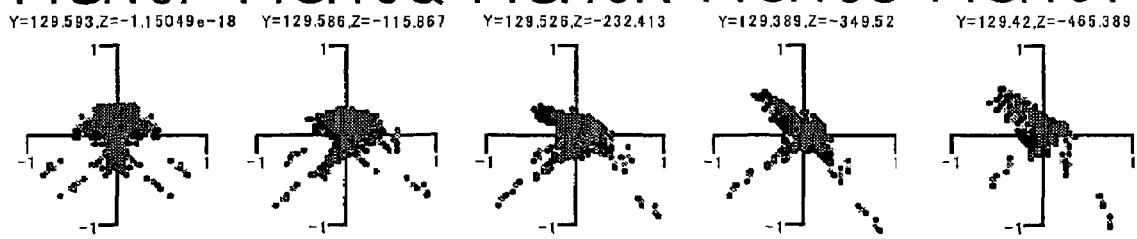
Figures 16U, 16V, 16W, 16X, 16Y:
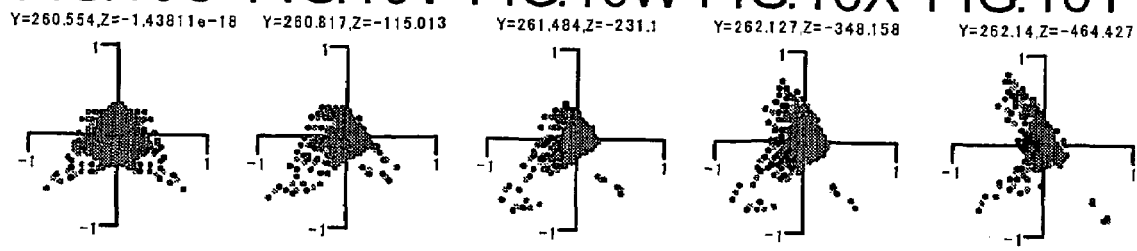
Figures 17A, 17B, 17C, 17D, 17E:
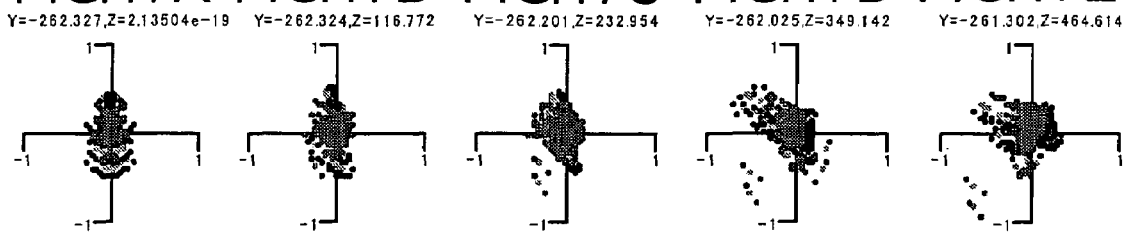
FIG. 17A to 17Y are spot diagrams on the screen surface with no mirrors slightly decentered in Example 3.
Figures 17F, 17G, 17H, 17I, 17J:
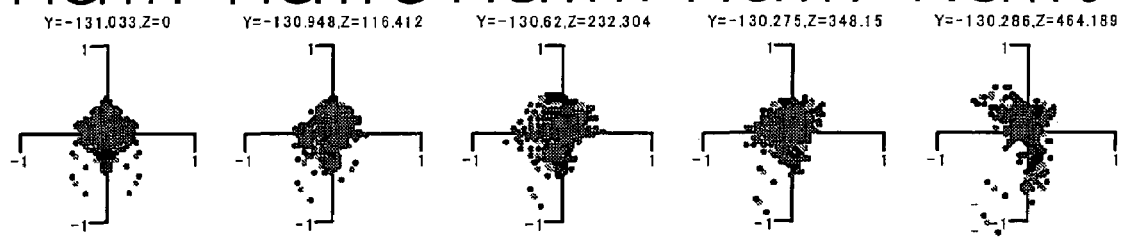
Figures 17K, 17L, 17M, 17N, 17O:
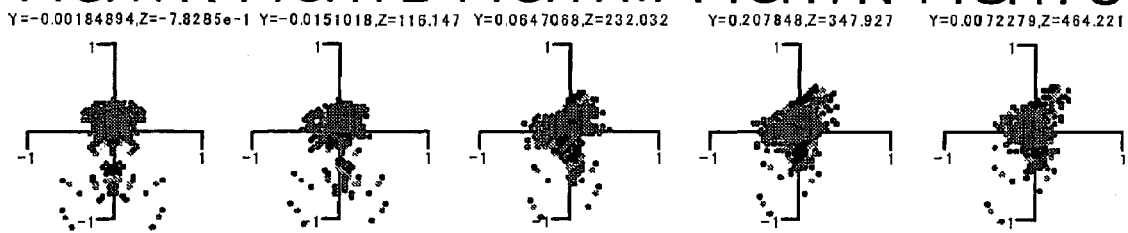
Figures 17P, 17Q, 17R, 17S, 17T:
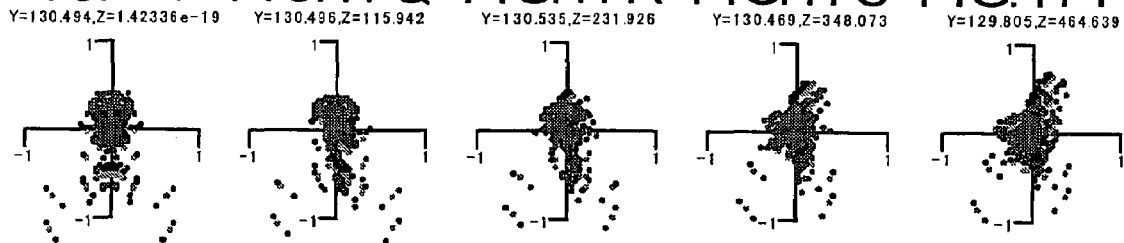
Figures 17U, 17V, 17W, 17X, 17Y:
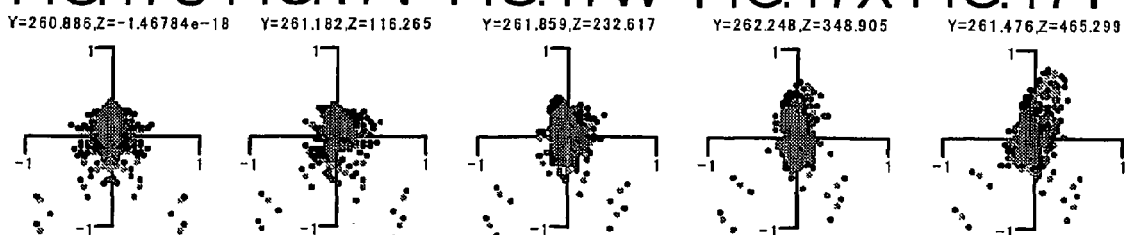
Figures 20A, 20B, 20C, 20D, 20E:
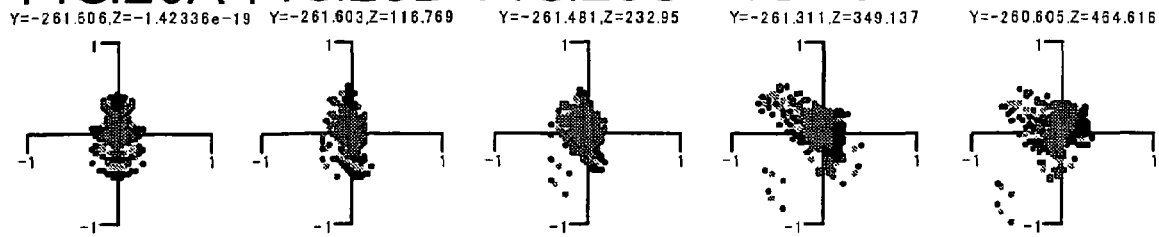
FIG. 20A to 20Y are spot diagrams on the screen surface with a second curved mirror slightly decentered in Example 3.
Figures 20F, 20G, 20H, 20I, 20J:
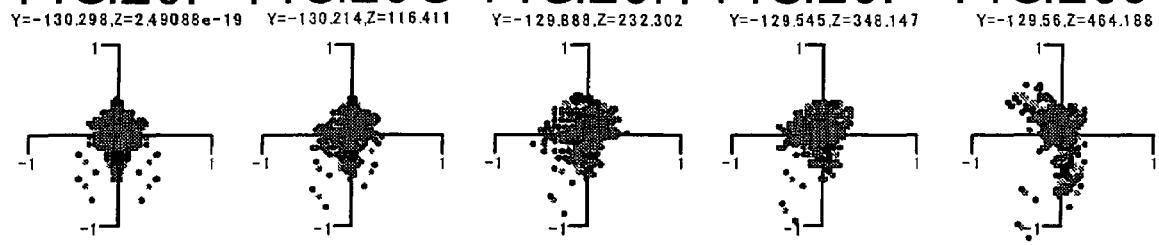
Figures 20K, 20L, 20M, 20N, 20O:
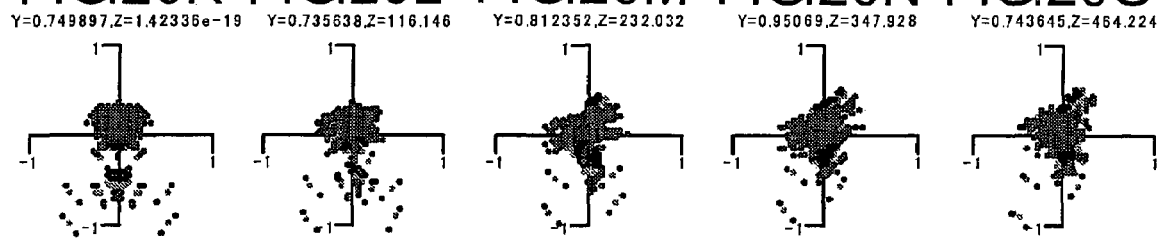
Figures 20P, 20Q, 20R, 20S, 20T:
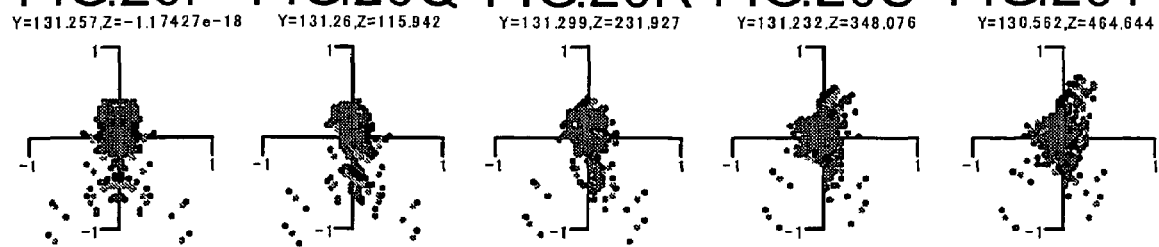
Figures 20U, 20V, 20W, 20X, 20Y:
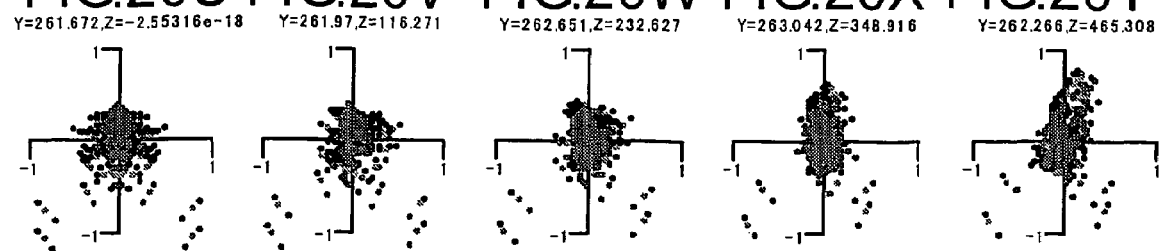
Figures 21A, 21B, 21C, 21D, 21E:
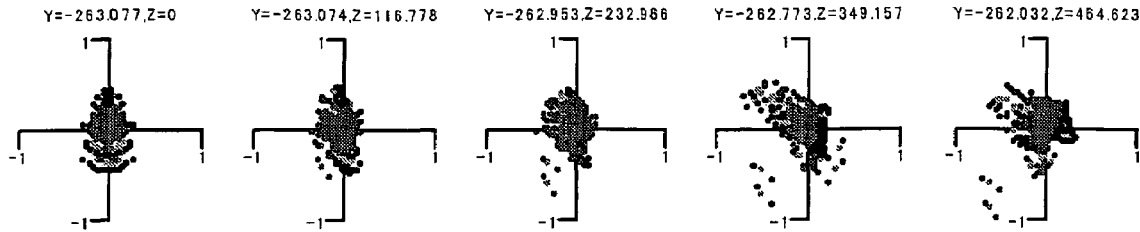
FIG. 21A to 21Y are spot diagrams on the screen surface with a first curved mirror slightly decentered in Example 3.
Figures 21F, 21G, 21H, 21I, 21J:
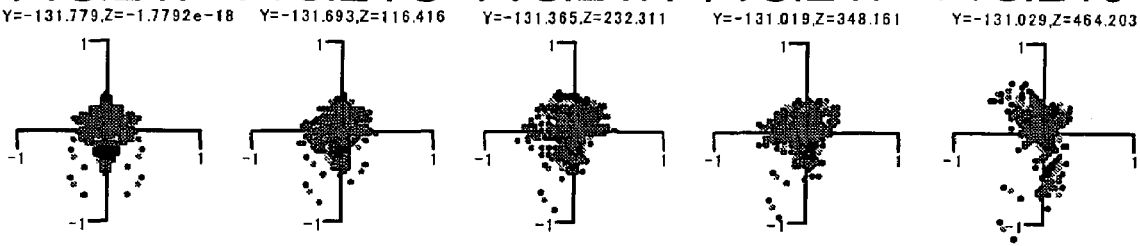
Figures 21K, 21L, 21M, 21N, 21O:
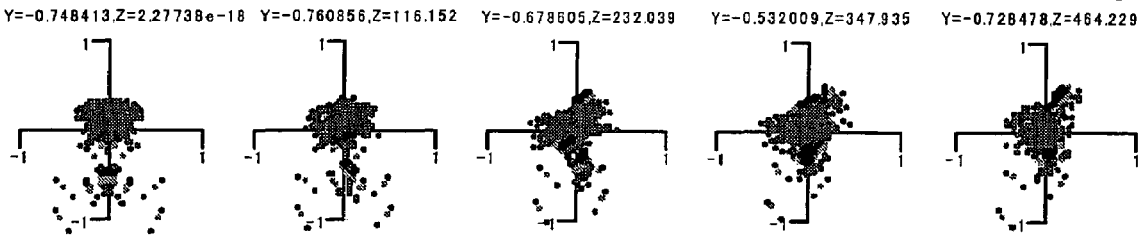
Figures 21P, 21Q, 21R, 21S, 21T:
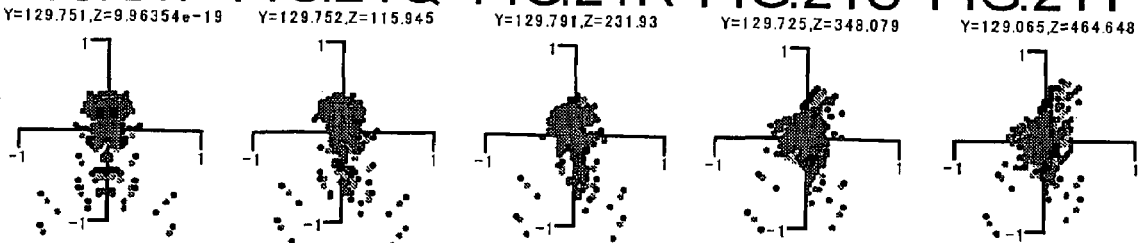
Figures 21U, 21V, 21W, 21X, 21Y:
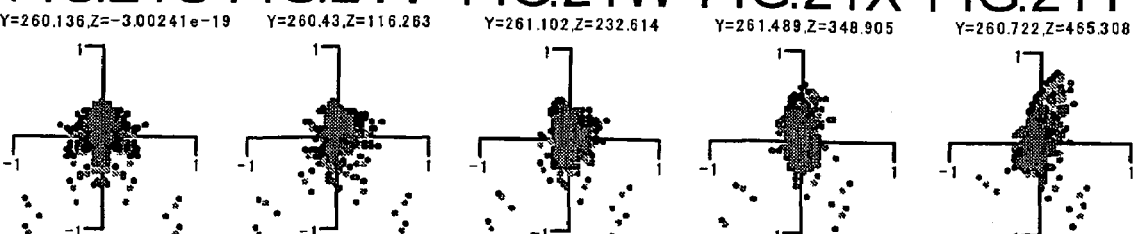
Figures 23A, 23B, 23C, 23D, 23E:
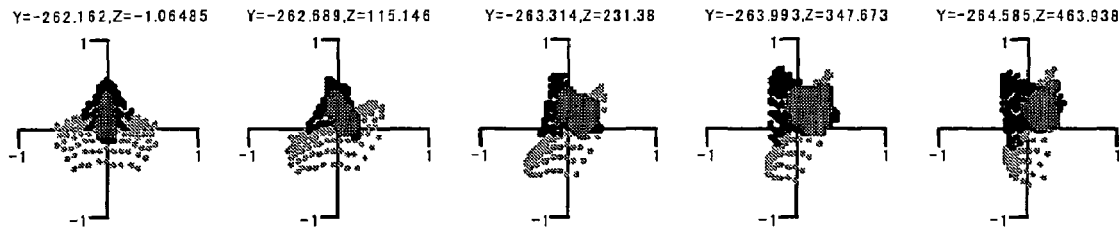
FIG. 23A to 23Y are spot diagrams on the screen surface with a first flat mirror slightly decentered in Example 4.
Figures 23F, 23G, 23H, 23I, 23J:
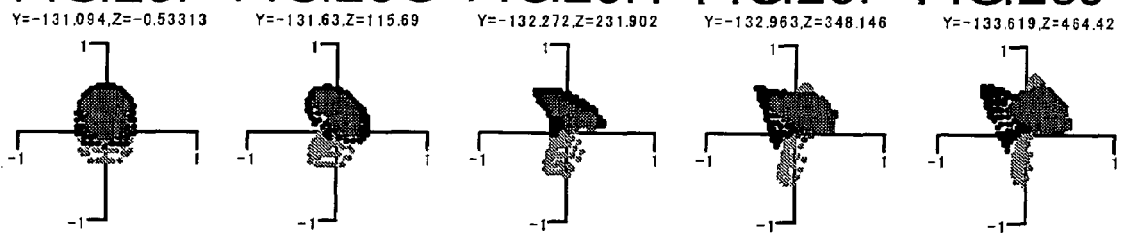
Figures 23K, 23L, 23M, 23N, 23O:
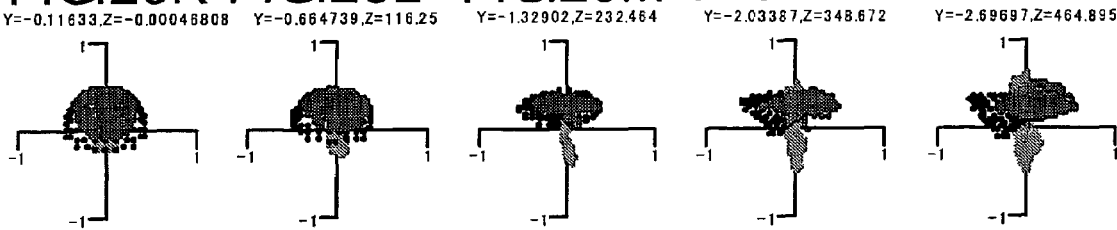
Figures 23P, 23Q, 23R, 23S, 23T:
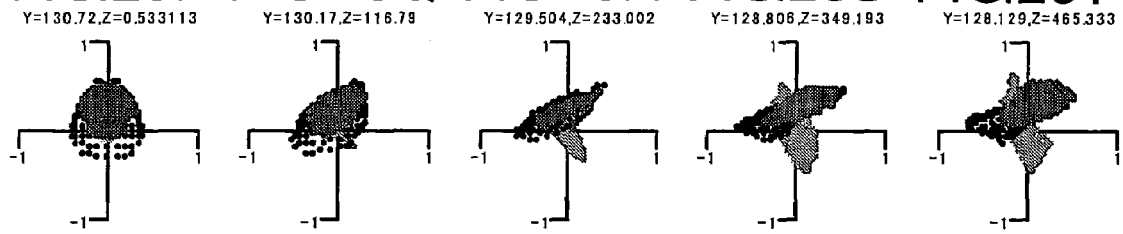
Figures 23U, 23V, 23W, 23X, 23Y:
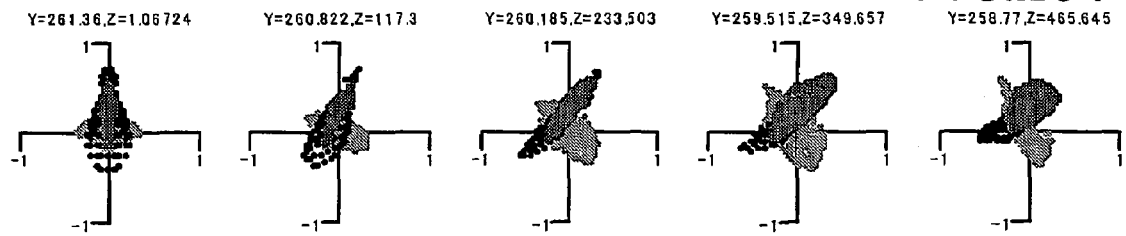
Figures 24A, 24B, 24C, 24D, 24E:
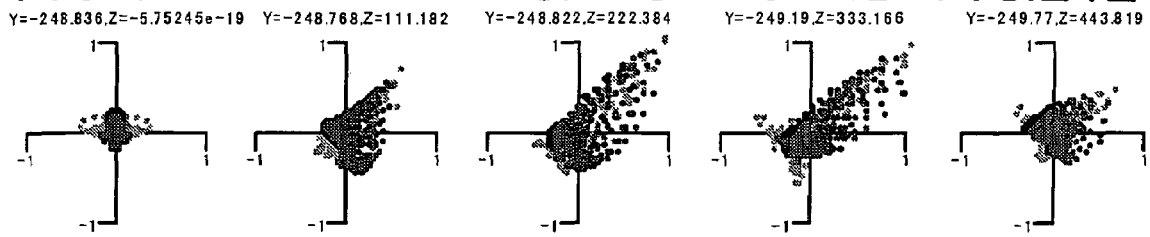
FIG. 24A to 24Y are spot diagrams on the screen surface with no mirrors slightly decentered in Example 5.
Figures 24F, 24G, 24H, 24I, 24J:
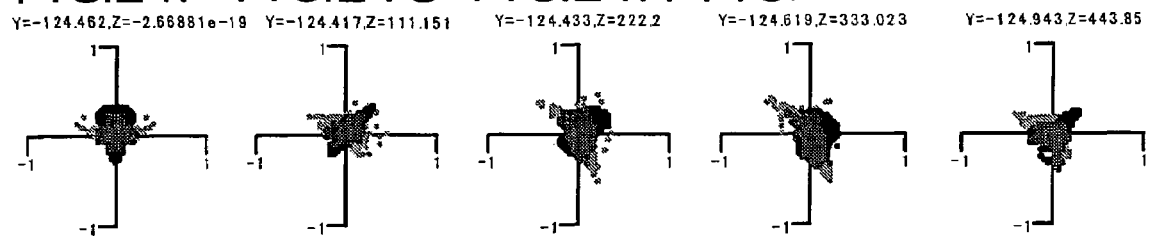
Figures 24K, 24L, 24M, 24N, 24O:
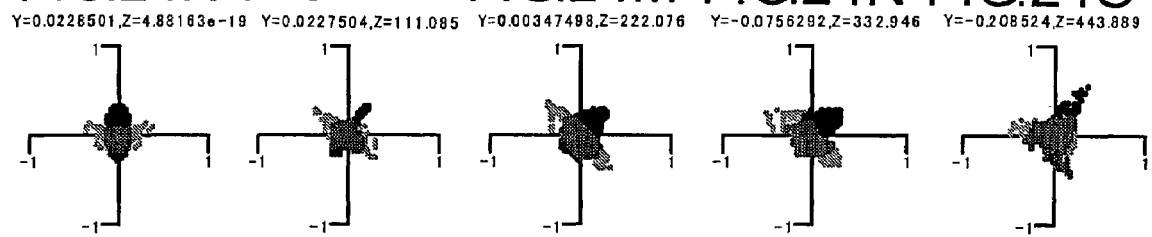
Figures 24P, 24Q, 24R, 24S, 24T:
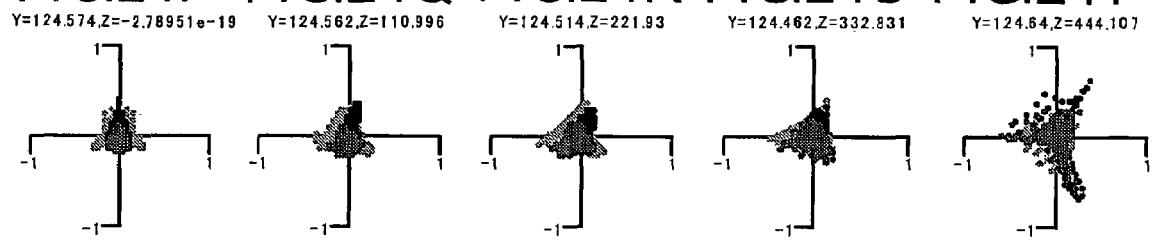
Figures 24U, 24V, 24W, 24X, 24Y:
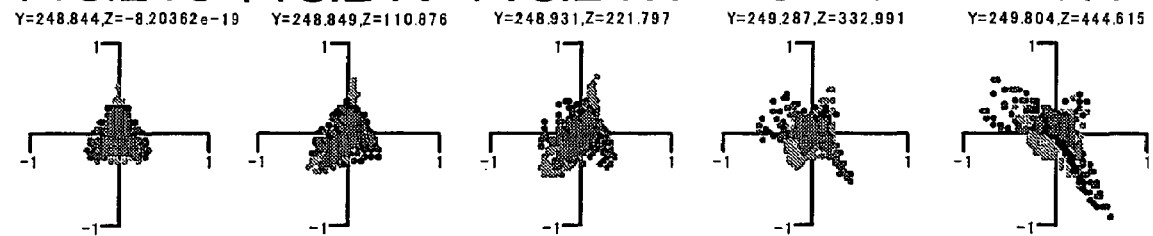

FIGS. 7A to 7Y through 25A to 25Y show spot diagrams of Examples 1 to 5. FIGS. 7A to 7Y through FIGS. 11A to 11Y show the spot diagrams on the screen surface Si of Example 1. FIGS. 7A to 7Y show the states before the mirror (reflective surface) is slightly decentered. FIGS. 8A to 8Y show the states with the fourth curved mirror M4 (largest curved reflective surface) slightly decentered. FIGS. 9A to 9Y show the states with the third curved mirror M3 slightly decentered. FIGS. 10A to 10Y show the states with the second curved mirror M2 slightly decentered. FIGS. 11A to 11Y show the states with the first curved mirror M1 slightly decentered. FIGS. 12A to 12Y through FIGS. 16A to 16Y show the spot diagrams on the screen surface Si of Example 2. FIGS. 12A to 12Y show the states before the mirror (reflective surface) is slightly decentered. FIGS. 13A to 13Y show the states with the fourth curved mirror M4 (largest curved reflective surface) slightly decentered. FIGS. 14A to 14Y show the states with the third curved mirror M3 slightly decentered. FIGS. 15A to 15Y show the states with the second curved mirror M2 slightly decentered. FIGS. 16A to 16Y show the states with the first curved mirror M1 slightly decentered. FIGS. 17A to 17Y through FIGS. 21A to 21Y show the spot diagrams on the screen surface Si of Example 3. FIGS. 17A to 17Y show the states before the mirror (reflective surface) is slightly decentered. FIGS. 18A to 18Y show the states with the fourth curved mirror M4 (largest curved reflective surface) slightly decentered. FIGS. 19A to 19Y show the states with the third curved mirror M3 slightly decentered. FIGS. 20A to 20Y show the states with the second curved mirror M2 slightly decentered. FIGS. 21A to 21Y show the states with the first curved mirror M1 slightly decentered. FIGS. 22A to 22Y through FIGS. 23A to 23Y show the spot diagrams on the screen surface Si of Example 4. FIGS. 22A to 22Y show the states before the mirror (reflective surface) is slightly decentered. FIGS. 23A to 23Y show the states with the first flat mirror F1 slightly decentered. FIGS. 24A to 24Y through FIGS. 25A to 25Y show the spot diagrams on the screen surface Si of Example 5. FIGS. 24A to 24Y show the states before the mirror (reflective surface) is slightly decentered. FIGS. 25A to 25Y show the states with the first curved mirror M1 slightly decentered.

Each spot diagram shows the imaging performance (in ±1 mm divisions) observed for 3 different wavelengths (460 nm, 546 nm, and 620 nm) at 25 evaluation points on the screen surface Si. The coordinates (Y, Z) in the diagrams are local coordinates (Y, Z; mm; e−n=×10$^{-n}$) on the screen surface Si corresponding to the projection positions of the spot barycenters of the individual evaluation points. Since Examples 1 to 5 are all constructed as optical systems plane-symmetric with respect to the XY-plane, each spot diagram only shows the positive-Z-side half of the screen surface Si, and the other half is omitted from illustration. The evaluation points conjugate with an array of vertically five and horizontally five points that equally divide the Z-side half of the display device surface So. When multiplied with the magnification β, the Y and Z values of the local coordinates of the points on the display device surface So indicate the ideal imaging points on the spot diagrams, and the deviations from those calculated values indicate distortion. In each spot diagram, the starting point lies on the ±Y and +Z sides of the display device surface So. In Examples 1, the image inverts vertically at the ceiling, i.e., the first flat mirror F1, and thus the sign (+/−) of Y reverses. In Example 2, where the number of reflective surfaces is even, the image reverses horizontally at the rear surface, i.e., first flat mirror F1; therefore, a Z value on the screen surface Si is negative.

Construction Data of Example 1

So (Display Device Surface)

Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000(r=∞)
N'=1.00000
T'=0.47

S1 (Entrance-Side Surface of Cover Glass CG)
N=1.00000
C0=0.00000000(r=∞)
N'=1.51872,vd=64.20
T'=3

S2 (Exit-Side Surface of Cover Glass CG)
N=1.51872,vd=64.20
C0=0.00000000(r=∞)
N'=1.00000

S3 (First Curved Mirror M1)
Coordinates:
O: 89.46300, −32.99640, 0.00000
VX: 0.99362145, −0.11276709, 0.00000000
VY: 0.11276709, 0.99362145, 0.00000000
N=1.00000
C0=−0.00971266(r=−102.9584)
N'=−1.00000

S4* (Entrance-Side Surface of Lens L1)
Coordinates:
O: 36.96700, −27.83360, 0.00000
VX: −0.99996402, 0.00848272, 0.00000000
VY: 0.00848272, 0.99996402, 0.00000000
N=1.00000
C0=0.00000000(r=∞),R=8.82(ST)

Aspherical Surface Data:
ϵ=1.00000
A(4)=1.28254E-6
A(6)=−2.24341E-8
A(8)=5.83743E-10
A(10)=−6.64056E-12
A(12)=2.6756E-14
N'=1.52729,vd=56.38

S5 (Exit-Side Surface of Lens L1)

Coordinates:
O: 34.96700, −27.83360, 0.00000
VX: −0.99996402, 0.00848272, 0.00000000
VY: 0.00848272, 0.99996402, 0.00000000
N=1.52729,vd=56.38
C0=0.00000000(r=∞)
N'=1.00000

S6* (Second Curved Mirror M2)

Coordinates:
O: 13.32900, −23.75840, 0.00000
VX: −0.99755436, 0.06989494, 0.00000000
VY: 0.06989494, 0.99755436, 0.00000000
N=1.00000
C0=0.00885999(r=112.8669)

Aspherical Surface Data:
ϵ=3.5617
A(4)=1.10876E-6
A(6)=−3.50858E-10
A(8)=2.37951E-12
A(10)=−9.55952E-16
A(12)=−5.3468E-19
N'=−1.00000

S7$ (Third Curved Mirror M3)

Coordinates:
O: 87.92300, −103.72600, 0.00000
VX: 0.93177279, −0.36304197, 0.00000000
VY: 0.36304197, 0.93177279, 0.00000000
N=1.00000
C0=0.00000000(r=∞)

Aspherical Surface Data:
ϵ=1.00000
G(2, 0)=0.00042233
G(3, 0)=−1.45538E-5
G(4, 0)=−3.8612E-7
G(5, 0)=5.7352E-9
G(6, 0)=2.29675E-10
G(7, 0)=−8.92223E-12
G(8, 0)=−2.21444E-13
G(9, 0)=9.89721E-15
G(10, 0)=2.449E-16
G(0, 2)=−7.54687E-5
G(1, 2)=−3.89476E-5
G(2, 2)=4.28778E-8
G(3, 2)=2.00852E-8
G(4, 2)=9.86227E-11
G(5, 2)=4.29665E-14
G(6, 2)=4.77323E-13
G(7, 2)=−2.5096E-15
G(8, 2)=−2.97959E-16
G(0, 4)=4.52954E-7
G(1, 4)=1.18742E-8
G(2, 4)=−1.62558E-10
G(3, 4)=−1.57615E-11
G(4, 4)=−4.68176E-13
G(5, 4)=−6.90848E-15
G(6, 4)=−4.18622E-16
G(0, 6)=1.49726E-11
G(1, 6)=5.38503E-12
G(2, 6)=5.12064E-13
G(3, 6)=1.68718E-14
G(4, 6)=9.20023E-16
G(0, 8)=−2.53574E-13
G(1, 8)=−1.03087E-14
G(2, 8)=−5.0665E-16
G(0, 10)=2.13192E-16
N'=−1.00000

S8$ (Fourth Curved Mirror M4)

Coordinates:
O: 23.86600, −56.08940, 0.00000
VX: −0.99987601, −0.01574665, 0.00000000
VY: −0.01574665, 0.99987601, 0.00000000
N=1.00000
C0=0.04297270(r=23.2706)

Aspherical Surface Data:
ϵ=−0.897295
G(2, 0)=−0.00218985
G(3, 0)=−1.26163E-5
G(4, 0)=−4.56195E-7
G(5, 0)=−5.97902E-9
G(6, 0)=−1.99994E-11
G(7, 0)=1.80355E-13
G(8, 0)=1.85429E-15
G(9, 0)=7.95413E-18
G(10, 0)=2.16144E-20
G(0, 2)=−0.00658332
G(1, 2)=−0.000122052
G(2, 2)=−2.66385E-6
G(3, 2)=−4.01263E-8
G(4, 2)=−4.11471E-10
G(5, 2)=−2.99993E-12
G(6, 2)=−1.39283E-14
G(7, 2)=−2.95315E-17
G(8, 2)=−1.19023E-20
G(0, 4)=−1.53887E-7
G(1, 4)=−3.10955E-10
G(2, 4)=1.39109E-10
G(3, 4)=2.1765E-12
G(4, 4)=1.35934E-14
G(5, 4)=6.40525E-17
G(6, 4)=2.83967E-19
G(0, 6)=2.62161E-10
G(1, 6)=5.7036E-12
G(2, 6)=2.00802E-14
G(3, 6)=−1.83097E-16
G(4, 6)=−1.05122E-18
G(0, 8)=−4.71494E-14
G(1, 8)=−1.11943E-15
G(2, 8)=−5.76737E-18
G(0, 10)=−8.64237E-19
N'=−1.00000

S9 (First Flat Mirror F1)

Coordinates:
O: 400.00000, −503.02000, 0.00000
VX: 0.08626777, −0.99627199, 0.00000000
VY: 0.99627199, 0.08626777, 0.00000000

N=1.00000
C0=0.00000000(r=∞)
N'=−1.00000

Si (Screen Surface)

Coordinates:
   O: 201.49792, −226.50567, 0.00000
   VX: 0.96035280, 0.27878754, 0.00000000
   VY: −0.27878754, 0.96035280, 0.00000000

Construction Data of Example 2

So (Display Device Surface)

Coordinates:
   O: 0.00000, 0.00000, 0.00000
   VX: 1.00000000, 0.00000000, 0.00000000
   VY: 0.00000000, 1.00000000, 0.00000000
N=1.00000
C0=0.00000000(r=∞)
N'=1.00000
T'=0.47

S1 (Entrance-Side Surface of Cover Glass CG)
N=1.00000
C0=0.00000000(r=∞)
N'=1.51872,vd=64.20
T'=3

S2 (Exit-Side Surface of Cover Glass CG)
N=1.51872,vd=64.20
C0=0.00000000(r=∞)
N'=1.00000

S3 (First Curved Mirror M1)

Coordinates:
   O: 63.93200, −6.58459, 0.00000
   VX: 0.99171573, 0.12845198, 0.00000000
   VY: −0.12845198, 0.99171573, 0.00000000
N=1.00000
C0=−0.01381290(r=−72.3961)
N'=−1.00000

S4$ (Entrance-Side Surface of Lens L1)

Coordinates:
   O: 26.97200, −20.57770, 0.00000
   VX: −0.98611760, −0.16604840, 0.00000000
   VY: −0.16604840, 0.98611760, 0.00000000
N=1.00000
C0=0.00000000(r=∞),R=6.2(ST)

Aspherical Surface Data:
   ϵ=1.00000
   G(3, 0)=−1.04069E-5
   G(4, 0)=5.4627E-6
   G(5, 0)=−1.56417E-7
   G(6, 0)=1.78703E-9
   G(7, 0)=2.15622E-9
   G(8, 0)=−1.53341E-10
   G(1, 2)=4.53917E-6
   G(2, 2)=8.83809E-6
   G(3, 2)=−2.1498E-7
   G(4, 2)=−5.79568E-9
   G(5, 2)=−1.81811E-10
   G(6, 2)=−1.17395E-9
   G(0, 4)=2.97325E-6
   G(1, 4)=−1.57521E-7
   G(2, 4)=6.57042E-9
   G(3, 4)=−4.77581E-8
   G(4, 4)=−3.83365E-9
   G(5, 4)=1.70838E-9
   G(6, 4)=2.45928E-10
   G(0, 6)=−9.69104E-9
   G(1, 6)=−3.18584E-10
   G(2, 6)=−1.81822E-10
   G(3, 6)=1.39723E-9
   G(4, 6)=−9.77212E-11
   G(0, 8)=1.11676E-10
N'=1.52729,vd=56.38

S5 (Exit-Side Surface of Lens L1)

Coordinates:
   O: 24.94400, −20.57770, 0.00000
   VX: −0.98611760, −0.16604840, 0.00000000
   VY: −0.16604840, 0.98611760, 0.00000000
N=1.52729,vd=56.38
C0=0.00000000(r=∞)
N'=1.00000

S6* (Second Curved Mirror M2)

Coordinates:
   O: 12.42200, −17.01710, 0.00000
   VX: −0.99853028, 0.05419663, 0.00000000
   VY: 0.05419663, 0.99853028, 0.00000000
N=1.00000
C0=0.01290230(r=77.5056)

Aspherical Surface Data:
   ϵ=2.73078
   A(4)=2.04292E-6
   A(6)=2.6091E-9
   A(8)=2.04236E-11
   A(10)=−4.84781E-14
   A(12)=6.89965E-17
N'=−1.00000

S7$ (Third Curved Mirror M3)

Coordinates:
   O: 60.97000, −71.10180, 0.00000
   VX: 0.94282012, −0.33330200, 0.00000000
   VY: 0.33330200, 0.94282012, 0.00000000
N=1.00000
C0=0.00000000(r=∞)

Aspherical Surface Data:
   ϵ=1.00000
   G(2, 0)=0.000227827
   G(3, 0)=−1.59697E-5
   G(4, 0)=−7.43793E-7
   G(5, 0)=3.26468E-9
   G(6, 0)=5.44779E-10
   G(7, 0)=8.61583E-12
   G(8, 0)=−2.1623E-13
   G(9, 0)=−7.26408E-15
   G(10, 0)=2.75758E-18
   G(0, 2)=−0.000273115
   G(1, 2)=−5.79289E-5
   G(2, 2)=−9.22533E-8
   G(3, 2)=5.32026E-8
   G(4, 2)=1.49402E-9
   G(5, 2)=1.26508E-12
   G(6, 2)=−7.39215E-13
   G(7, 2)=−2.705E-14
   G(8, 2)=−3.86941E-16
   G(0, 4)=9.21798E-7
   G(1, 4)=3.32615E-8

G(2, 4)=−1.02972E−10
G(3, 4)=−3.92896E−11
G(4, 4)=−1.46089E−12
G(5, 4)=−2.1023E−15
G(6, 4)=−1.43031E−16
G(0, 6)=−1.07535E−10
G(1, 6)=5.03513E−12
G(2, 6)=6.33597E−13
G(3, 6)=1.71413E−14
G(4, 6)=1.57028E−15
G(0, 8)=−7.15605E−14
G(1, 8)=−2.11158E−14
G(2, 8)=−1.00499E−15
G(0, 10)=1.18681E−16
N'=−1.00000

S8$ (Fourth Curved Mirror M4)

Coordinates:
O: −1.10600, −40.21540, 0.00000
VX: −0.99539428, 0.09586563, 0.00000000
VY: 0.09586563, 0.99539428, 0.00000000
N=1.00000
C0=0.03222160(r=31.0351)

Aspherical Surface Data:
$\epsilon$=−2.77033
G(2, 0)=−0.00116411
G(3, 0)=−7.29086E−6
G(4, 0)=−2.80926E−7
G(5, 0)=−4.21417E−9
G(6, 0)=−2.32031E−11
G(7, 0)=1.05632E−13
G(8, 0)=2.21671E−15
G(9, 0)=1.03511E−17
G(10, 0)=1.03581E−20
G(0, 2)=−0.000717564
G(1, 2)=−3.36047E−5
G(2, 2)=−1.87358E−6
G(3, 2)=−3.73724E−8
G(4, 2)=−4.19151E−10
G(5, 2)=−3.00373E−12
G(6, 2)=−1.35286E−14
G(7, 2)=−2.81857E−17
G(8, 2)=8.89147E−21
G(0, 4)=−3.94585E−7
G(1, 4)=−4.49598E−9
G(2, 4)=1.56948E−10
G(3, 4)=3.00606E−12
G(4, 4)=1.61973E−14
G(5, 4)=2.15876E−17
G(6, 4)=1.78649E−20
G(0, 6)=1.10862E−10
G(1, 6)=3.472E−12
G(2, 6)=1.91076E−14
G(3, 6)=−1.39812E−16
G(4, 6)=−9.9647E−19
G(0, 8)=−5.62039E−15
G(1, 8)=−2.36124E−16
G(2, 8)=−1.97717E−18
G(0, 10)=1.71896E−19
N'=−1.00000

S9 (First Flat Mirror F1)

Coordinates:
O: 35.97800, −177.05200, 0.00000
VX: 0.98397714, −0.17829469, 0.00000000
VY: 0.17829469, 0.98397714, 0.00000000
N=1.00000
C0=0.00000000(r=∞)
N'=−1.00000

S10 (Second Flat Mirror F2)

Coordinates:
O: −187.25900, −503.11200, 0.00000
VX: −0.94408245, 0.32970947, 0.00000000
VY: 0.32970947, 0.94408245, 0.00000000
N=1.00000
C0=0.00000000(r=∞)
N'=−1.00000

Si (Screen Surface)

Coordinates:
O: −83.63894, −570.35585, 0.00000
VX: 0.94408245, −0.32970947, 0.00000000
VY: −0.32970947, −0.94408245, 0.00000000

Construction Data of Example 3

So (Display Device Surface)

Coordinates:
O: 0.00000, 0.00000, 0.00000
VX: 1.00000000, 0.00000000, 0.00000000
VY: 0.00000000, 1.00000000, 0.00000000
N=1.00000
C0=0.00000000(r=∞)
N'=1.00000
T'=0.47

S1 (Entrance-Side Surface of Cover Glass CG)
N=1.00000
C0=0.00000000(r=∞)
N'=1.51045,vd=61.19
T'=3

S2 (Exit-Side Surface of Cover Glass CG)
N=1.51045,vd=61.19
C0=0.00000000(r=∞)
N'=1.00000

S3 (First Curved Mirror M1)

Coordinates:
O: 59.44400, −14.38300, 0.00000
VX: 1.00000000, 0.00000000, 0.00000000
VY: 0.00000000, 1.00000000, 0.00000000
N=1.00000
C0=−0.01351930(r=−73.9683)
N'=−1.00000

S4$ (Entrance-Side Surface of Lens L1)

Coordinates:
O: 23.88600, −18.08720, 0.00000
VX: −0.77138615, −0.63636735, 0.00000000
VY: −0.63636735, 0.77138615, 0.00000000
N=1.00000
C0=0.00000000(r=∞),R=6.95(ST)

Aspherical Surface Data:
  ϵ=1.00000
  G(1, 0)=−0.00711872
  G(2, 0)=−0.00024658
  G(3, 0)=−1.93678E-5
  G(4, 0)=3.64022E-6
  G(5, 0)=1.30218E-6
  G(6, 0)=−4.3095E-8
  G(7, 0)=−2.73884E-8
  G(8, 0)=6.72443E-10
  G(9, 0)=2.19506E-10
  G(10, 0)=−1.87929E-12
  G(0, 2)=0.00096106
  G(1, 2)=5.90368E-5
  G(2, 2)=5.82908E-6
  G(3, 2)=3.26898E-7
  G(4, 2)=2.71282E-9
  G(5, 2)=−4.88765E-9
  G(6, 2)=4.3078E-10
  G(7, 2)=−2.06835E-11
  G(8, 2)=−1.57359E-11
  G(0, 4)=9.94749E-7
  G(1, 4)=1.42893E-7
  G(2, 4)=2.81152E-8
  G(3, 4)=−2.219E-8
  G(4, 4)=−1.90164E-9
  G(5, 4)=4.12415E-10
  G(6, 4)=−2.55946E-12
  G(0, 6)=−3.26064E-9
  G(1, 6)=−8.03379E-9
  G(2, 6)=−3.44583E-10
  G(3, 6)=4.72961E-10
  G(4, 6)=5.53316E-12
  G(0, 8)=9.75636E-11
  G(1, 8)=9.46503E-11
  G(2, 8)=−5.65792E-12
  G(0,10)=−6.37224E-13
N'=1.52729,vd=56.38

S5 (Exit-Side Surface of Lens L1)

Coordinates:
  O: 21.92400, −18.08740, 0.00000
  VX: −0.77138615, −0.63636735, 0.00000000
  VY: −0.63636735, 0.77138615, 0.00000000
N=1.52729,vd=56.38
C0=0.00000000(r=∞)
N'=1.00000

S6* (Second Curved Mirror M2)

Coordinates:
  O: 0.944500, −12.40560, 0.00000
  VX: −0.99824279, 0.05925649, 0.00000000
  VY: 0.05925649, 0.99824279, 0.00000000
N=1.00000
C0=0.01004760(r=99.5263)

Aspherical Surface Data:
  ϵ=−16.6018
  A(4)=2.86157E-6
  A(6)=−1.82955E-9
  A(8)=1.43092E-11
  A(10)=−3.59947E-14
  A(12)=3.45086E-17
N'=−1.00000

S7$ (Third Curved Mirror M3)

Coordinates:
  O: 39.46100, −49.02960, 0.00000
  VX: 0.96884897, −0.24765233, 0.00000000
  VY: 0.24765233, 0.96884897, 0.00000000
N=1.00000
C0=0.00000000(r=∞)

Aspherical Surface Data:
  ϵ=1.00000
  G(2, 0)=−0.0015014
  G(3, 0)=1.6878E-6
  G(4, 0)=2.76396E-8
  G(5, 0)=2.80683E-9
  G(6, 0)=−1.55228E-10
  G(7, 0)=−1.675E-11
  G(8, 0)=−8.14499E-14
  G(9, 0)=8.61671E-14
  G(10, 0)=3.62876E-15
  G(0, 2)=−0.0005976
  G(1, 2)=−4.38879E-6
  G(2, 2)=4.17753E-7
  G(3, 2)=2.22518E-8
  G(4, 2)=−7.42109E-10
  G(5, 2)=−1.95053E-11
  G(6, 2)=5.70414E-12
  G(7, 2)=3.542E-14
  G(8, 2)=−7.43299E-15
  G(0, 4)=4.92962E-7
  G(1, 4)=2.13437E-8
  G(2, 4)=−2.30497E-10
  G(3, 4)=−8.63374E-11
  G(4, 4)=4.63483E-12
  G(5, 4)=4.81801E-14
  G(6, 4)=−1.67042E-14
  G(0, 6)=−4.33782E-10
  G(1, 6)=−4.23437E-11
  G(2, 6)=1.40786E-12
  G(3, 6)=2.12264E-13
  G(4, 6)=−3.29603E-15
  G(0, 8)=1.9199E-12
  G(1, 8)=4.0393E-14
  G(2, 8)=−2.2978E-15
  G(0,10)=−2.91598E-15
N'=−1.00000

S8$ (Fourth Curved Mirror M4)

Coordinates:
  O: −185.66300, 24.87620, 0.00000
  VX: −0.97385658, −0.22716373, 0.00000000
  VY: −0.22716373, 0.97385658, 0.00000000
N=1.00000
C0=0.00557196(r=179.4701)

Aspherical Surface Data:
  ϵ=1.00692
  G(2, 0)=−0.0113006
  G(3, 0)=−8.11037E-5
  G(4, 0)=−2.05436E-7
  G(5, 0)=−4.46619E-9
  G(6, 0)=−3.22006E-11
  G(7, 0)=2.00679E-13
  G(8, 0)=2.26432E-15
  G(9, 0)=4.45546E-18

G(10, 0)=−4.12552E−21
G(0, 2)=−0.00664662
G(1, 2)=−0.000217413
G(2, 2)=−2.26881E−6
G(3, 2)=−3.41546E−8
G(4, 2)=−4.65775E−10
G(5, 2)=−2.92576E−12
G(6, 2)=−1.12438E−14
G(7, 2)=−5.0852E−17
G(8, 2)=−1.47226E−19
G(0, 4)=9.35887E−7
G(1, 4)=4.69715E−8
G(2, 4)=3.05214E−10
G(3, 4)=−1.51625E−14
G(4, 4)=1.26809E−14
G(5, 4)=1.59893E−16
G(6, 4)=4.03446E−19
G(0, 6)=3.47782E−10
G(1, 6)=2.36674E−12
G(2, 6)=9.87926E−15
G(3, 6)=1.76962E−16
G(4, 6)=8.47476E−19
G(0, 8)=−7.68412E−14
G(1, 8)=−8.43681E−16
G(2, 8)=−2.95386E−18
G(0,10)=2.06544E−18
N'=−1.00000

S9 (First Flat Mirror F1)

Coordinates:
   O: 68.44900, 0.00000, 0.00000
   VX: 0.99560666, 0.09363432, 0.00000000
   VY: −0.09363432, 0.99560666, 0.00000000
N=1.00000
C0=0.00000000(r=∞)
N'=−1.00000

Si (Screen Surface)

Coordinates:
   O: −154.83987, −418.49080, 0.00000
   VX: −0.99803704, −0.06262642, 0.00000000
   VY: 0.06262642, −0.99803704, 0.00000000

Construction Data of Example 4

Si (Screen Surface)

Coordinates:
   O: −232.137457, 0.00000, 0.00000
   VX: 1.00000000, 0.00000000, 0.00000000
   VY: 0.00000000, 1.00000000, 0.00000000

S1 (Second Flat Mirror F2)

Coordinates:
   O: 0.00000, 0.00000, 0.000000
   VX: 1.00000000, 0.00000000, 0.00000000
   VY: 0.00000000, 1.00000000, 0.00000000
N=1.00000
C0=0.00000000(r=∞)
N'=−1.00000
T'=−200

S2* (First Curved Mirror M1)
N=−1.00000
C0=−0.00999840(r=−100.0160)

Aspherical Surface Data:
   ϵ=−4.81601549
   A(4)=−1.74739582E−8
   A(6)=5.24990307E−12
   A(8)=−5.59989013E−16
   A(10)=2.04603165E−20
N'=1.00000
T'=170.942

S3 (First Flat Mirror F1)
N=1.00000
C0=0.00000000(r=∞)
N'=1.00000
T'=29.1366

S4 (Exit-Side Surface of Lens L8 of Refractive Optical System LG)
N=1.00000
C0=0.03722168(r=26.8661)
N'=1.51872,vd=64.20
T'=10.7262

S5 (Entrance-Side Surface of Lens L8 of Refractive Optical System LG)
N=1.51872,vd=64.20
C0=0.00180074(r=555.3278)
N'=1.00000
T'=0.3

S6 (Exit-Side Surface of Lens L7 of Refractive Optical System LG)
N=1.00000
C0=0.03122531(r=32.0253)
N'=1.76167,vd=27.53
T'=1.79377

S7 (Entrance-Side Surface of Lens L7 of Refractive Optical System LG)
N=1.76167,vd=27.53
C0=0.06679096(r=14.9721)
N'=1.00000
T'=11.9551

S8 (Exit-Side Surface of Lens L6 of Refractive Optical System LG)
N=1.00000
C0=−0.04207365(r=−23.7678)
N'=1.76167,vd=27.53
T'=1.2

S9 (Cemented Surface of Lens L6 of Refractive Optical System LG)
N=1.76167,vd=27.53
C0=0.06633367(r=15.0753)
N'=1.55278,vd=47.00
T'=0.01

S10 (Cemented Surface of Lens L6 of Refractive Optical System LG)
N=1.55278,vd=47.00
C0=0.06633367(r=15.0753)
N'=1.72341,vd=50.34
T'=5.69337

S11 (Entrance-Side Surface of Lens L6 of Refractive Optical System LG)
N=1.72341,vd=50.34
C0=0.02557156(r=39.1059)
N'=1.00000
T'=16.01022

S12 (Exit-Side Surface of Lens L5 of Refractive Optical System LG)
N=1.00000
C0=−0.00087955(r=−1136.9402)
N'=1.76167,vd=27.53
T'=8.02254

S13 (Entrance-Side Surface of Lens L5 of Refractive Optical System LG)
N=1.76167,vd=27.53
C0=−0.02626830(r=−38.0687)
N'=1.00000
T'=0.3

S14 (Exit-Side Surface of Lens L4 of Refractive Optical System LG)
N=1.00000
C0=0.03188959(r=31.3582)
N'=1.67764,vd=32.17
T'=8.88038

S15 (Entrance-Side Surface of Lens L4 of Refractive Optical System LG)
N=1.67764,vd=32.17
C0=0.00261648(r=382.1932)
N'=1.00000
T'=20.25139

S16 (Exit-Side Surface of Lens L3 of Refractive Optical System LG)
N=1.00000
C0=−0.02401764(r=−41.6361)
N'=1.76167,vd=27.53
T'=1.20604

S17 (Cemented Surface of Lens L3 of Refractive Optical System LG)
N=1.76167,vd=27.53
C0=0.06272194(r=15.9434)
N'=1.55278,vd=47.00
T'=0.01

S18 (Cemented Surface of Lens L3 of Refractive Optical System LG)
N=1.55278,vd=47.00
C0=0.06272194(r=15.9434)
N'=1.68081,vd=55.52
T'=5.7965

S19 (Entrance-Side Surface of Lens L3 of Refractive Optical System LG)
N=1.68081,vd=55.52
C0=−0.01181674(r=−84.6257)
N'=1.00000
T'=0.30

S20 (Exit-Side Surface of Lens L2 of Refractive Optical System LG)
N=1.00000
C0=0.01323680(r=75.5470)
N'=1.68081,vd=55.52
T'=5.36152

S21 (Cemented Surface of Lens L2 of Refractive Optical System LG)
N=1.68081,vd=55.52
C0=−0.05746218(r=−17.4028)
N'=1.55278,vd=47.00
T'=0.01

S22 (Cemented Surface of Lens L2 of Refractive Optical System LG)
N=1.55278,vd=47.00
C0=−0.05746218(r=−17.4028)
N'=1.76167,vd=27.53
T'=1.48006

S23 (Entrance-Side Surface of Lens L2 of Refractive Optical System LG)
N=1.76167,vd=27.53
C0=0.00183296(r=545.5664)
N'=1.00000
T'=1.23735

S24 (Aperture Stop ST)
N=1.00000
C0=0.00000000(r=∞),R=8.40578
N'=1.00000
T'=2.5

S25 (Exit-Side Surface of Lens L1 of Refractive Optical System LG)
N=1.00000
C0=0.00000000(r=∞)
N'=1.81080,vd=40.73
T'=3

S26* (Entrance-Side Surface of Lens L2 of Refractive Optical System LG)
N=1.81080,vd=40.73
C0=−0.02359235(r=−42.3866)

Aspherical Surface Data:
ϵ=1.00000
A(4)=9.09254038E-6
A(6)=2.64983712E-9
A(8)=−1.04398901E-10
A(10)=4.56455473E-13
N'=1.00000
T'=31.5274

S27 (Exit-Side Surface of Cover Glass CG)
N=1.00000
C0=0.00000000(r=∞)
N'=1.51045,vd=61.19
T'=3

S28 (Entrance-Side Surface of Cover Glass CG)
N=1.51045,vd=61.19
C0=0.00000000(r=∞)
N'=1.00000
T'=0.5

So (Display Device Surface)
N=1.00000
C0=0.00000000(r=∞)
N'=1.00000

Construction Data of Example 5

So (Display Device Surface)

Coordinates:
    O: 0.00000, 0.00000, 0.00000
    VX: 1.00000000, 0.00000000, 0.00000000
    VY: 0.00000000, 1.00000000, 0.00000000
N=1.00000
C0=0.00000000(r=∞)
N'=1.00000
T'=0.5

S1 (Entrance-Side Surface of Cover Glass CG)
N=1.00000
C0=0.00000000(r=∞)
N'=1.51045,vd=61.19
T'=3

S2 (Exit-Side Surface of Cover Glass CG)
N=1.51045,vd=61.19
C0=0.00000000(r=∞)
N'=1.00000

S3* (Entrance-Side Surface of Lens L1 of Refractive Optical System LG)

Coordinates:
    O: 34.00000, 0.16725, 0.00000
    VX: 0.99904194, 0.04376303, 0.00000000
    VY: −0.04376303, 0.99904194, 0.00000000
N=1.00000
C0=0.00204274(r=489.5382)

Aspherical Surface Data:
    ϵ=1.00000
    A(4)=−5.00465690E-5
    A(6)=−7.39670669E-8
    A(8)=−1.75197444E-9
    A(10)=4.12175570E-11
N'=1.69977,vd=55.84
T'=1.84179

S4 (Exit-Side Surface of Lens L1 of Refractive Optical System LG)
N=1.69977,vd=55.84
C0=0.00000000(r=∞)
N'=1.00000
T'=0.0001

S5 (Aperture Stop ST)
N=1.00000
C0=0.00000000(r=∞),R=5.2800
N'=1.00000
T'=2.39002

S6 (Entrance-Side Surface of Lens L2 of Refractive Optical System LG)
N=1.00000
C0=−0.02649622(r=−37.7412)
N'=1.72970,vd=28.85
T'=1.81923

S7 (Cemented Surface of Lens L2 of Refractive Optical System LG)
N=1.72970,vd=28.85
C0=0.05211926(r=19.1868)
N'=1.63067,vd=58.95
T'=4.85078

S8 (Exit-Side Surface of Lens L2 of Refractive Optical System LG)
N=1.63067,vd=58.95
C0=−0.04804299(r=−20.8147)
N'=1.00000
T'=12.1771

S9 (Entrance-Side Surface of Lens L3 of Refractive Optical System LG)
N=1.00000
C0=−0.01100077(r=−90.9027)
N'=1.75648,vd=42.47
T'=5.42944

S10 (Exit-Side Surface of Lens L3 of Refractive Optical System LG)
N=1.75648,vd=42.47
C0=−0.04368526(r=−22.8910)
N'=1.00000
T'=31.7315

S11 (Entrance-Side Surface of Lens L4 of Refractive Optical System LG)
N=1.00000
C0=−0.05243928(r=−19.0697)
N'=1.57422,vd=42.87
T'=2

S12 (Exit-Side Surface of Lens L4 of Refractive Optical System LG)
N=1.57422,vd=42.87
C0=−0.00497167(r=−201.1396)
N'=1.00000
T'=11.0652

S13$ (Entrance-Side Surface of Lens L5 of Refractive Optical System LG)
N=1.00000
C0=−0.02572471(r=−38.8731)

Aspherical Surface Data:
    ϵ=1.00000
    G(2, 0)=−0.00235851082
    G(3, 0)=0.000127099536
    G(4, 0)=−2.72876648E-6
    G(5, 0)=2.05042105E-7
    G(6, 0)=−1.41376330E-9
    G(7, 0)=−7.38327248E-10
    G(8, 0)=−2.69549205E-11
    G(9, 0)=3.96158591E-12
    G(10, 0)=−7.28373869E-14
    G(0, 2)=−0.00179790062
    G(1, 2)=0.000119508476
    G(2, 2)=−3.37474254E-6
    G(3, 2)=−2.33213951E-7
    G(4, 2)=8.31897086E-8
    G(5, 2)=−5.87625715E-9
    G(6, 2)=−1.55694736E-10
    G(7, 2)=2.66789771E-11
    G(8, 2)=−5.98373894E-13
    G(0, 4)=9.81716933E-7
    G(1, 4)=−3.84549661E-7
    G(2, 4)=4.76438571E-8
    G(3, 4)=−7.99335107E-10
    G(4, 4)=−3.51742107E-10
    G(5, 4)=3.20064736E-11
    G(6, 4)=−7.51776616E-13
    G(0, 6)=8.76254855E-10
    G(1, 6)=1.27340621E-9
    G(2, 6)=−1.50766224E-10

G(3, 6)=4.61476332E-12
G(4, 6)=2.10022093E-14
G(0, 8)=-8.16994844E-12
G(1, 8)=-1.89706212E-12
G(2, 8)=2.00988044E-13
G(0,10)=2.68020824E-14
N'=1.49329,vd=57.82
T'=3.09674

S14 (Exit-Side Surface of Lens L5 of Refractive Optical System LG)
N=1.49329,vd=57.82
C0=-0.02572471(r=-38.8731)
N'=1.00000

S15* (First Curved Mirror M1)

Coordinates:
  O: 131.03087, -2.34225, 0.00000
  VX: 0.93890734, -0.34417002, 0.00000000
  VY: 0.34417002, 0.93890734, 0.00000000
N=1.00000
C0=-0.00417675(r=-239.4208)

Aspherical Surface Data:
  $\epsilon$=1.00000
  A(4)=7.63255675E-7
  A(6)=-2.52707075E-10
  A(8)=5.17586168E-14
  A(10)=-4.53900214E-18
N'=-1.00000

S16* (Second Curved Mirror M2)

Coordinates:
  O: 53.01223, 65.80982, 0.00000
  VX: -0.79957051, 0.60057223, 0.00000000
  VY: 0.60057223, 0.79957051, 0.00000000
N=1.00000
C0=0.01952516(r=51.2160)

Aspherical Surface Data:
  $\epsilon$=-3.82885253
  A(4)=-6.52773208E-8
  A(6)=6.18183888E-12
  A(8)=-3.45459065E-16
  A(10)=8.19156848E-21
N'=-1.00000

S17 (First Flat Mirror F1)

Coordinates:
  O: 138.84308, -5.79166, 0.00000
  VX: 0.82833853, -0.56022788, 0.00000000
  VY: 0.56022788, 0.82833853, 0.00000000
N=1.00000
C0=0.00000000(r=∞)
N'=-1.00000

Si (Screen Surface)

Coordinates:
  O: 216.48195, 376.73268, 0.00000
  VX: -0.82833853, 0.56022788, 0.00000000
  VY: -0.56022788, -0.82833853, 0.00000000

TABLE 1

| Example 1 | Amount of Pixel Shift on Screen Surface Si (mm) | |
|---|---|---|
| Corresponding Coordinates: FIGS. 8A-8Y | Slightly Decentered Mirror: Fourth Curved Mirror M4 | |
| Amount of Decentering (min.): RY = 0.0, RZ = 0.75 | | |

TABLE 1-continued

| Example 1 | Amount of Pixel Shift on Screen Surface Si (mm) | |
|---|---|---|
| 1.178 | 1.172 | 1.154 |
| | 0.958 | 0.958 |
| 0.744 | 0.751 | 0.765 |
| | 0.546 | 0.569 |
| 0.366 | 0.382 | 0.421 |
| | | Average: 0.766 |
| Corresponding Coordinates: FIGS. 9A-9Y | Slightly Decentered Mirror: Third Curved Mirror M3 | |
| Amount of Decentering (min.): RY = 0.0, RZ = 0.675 | | |
| 0.867 | 0.868 | 0.858 |
| | 0.797 | 0.802 |
| 0.743 | 0.745 | 0.750 |
| | 0.708 | 0.718 |
| 0.677 | 0.689 | 0.714 |
| | | Average: 0.764 |
| Corresponding Coordinates: FIGS. 10A-10Y | Slightly Decentered Mirror: Second Curved Mirror M2 | |
| Amount of Decentering (min.): RY = 0.0, RZ = 0.55 | | |
| 0.751 | 0.747 | 0.729 |
| | 0.770 | 0.766 |
| 0.793 | 0.787 | 0.779 |
| | 0.814 | 0.812 |
| 0.830 | 0.838 | 0.852 |
| | | Average: 0.790 |
| Corresponding Coordinates: FIGS. 11A-11Y | Slightly Decentered Mirror: First Curved Mirror M1 | |
| Amount of Decentering (min.): RY = 0.0, RZ = 0.15 | | |
| 0.745 | 0.744 | 0.728 |
| | 0.742 | 0.741 |
| 0.743 | 0.738 | 0.734 |
| | 0.744 | 0.744 |
| 0.742 | 0.750 | 0.765 |
| | | Average: 0.743 |

TABLE 2

| Example 2 | Amount of Pixel Shift on Screen Surface Si (mm) | |
|---|---|---|
| Corresponding Coordinates: FIGS. 13A-13Y | Slightly Decentered Mirror: Fourth Curved Mirror M4 | |
| Amount of Decentering (min.): RY = 0.0, RZ = 0.975 | | |
| 1.232 | 1.223 | 1.195 |
| | 0.955 | 0.958 |
| 0.691 | 0.704 | 0.728 |
| | 0.463 | 0.501 |
| 0.270 | 0.298 | 0.362 |
| | | Average: 0.737 |
| Corresponding Coordinates: FIGS. 14A-14Y | Slightly Decentered Mirror: Third Curved Mirror M3 | |
| Amount of Decentering (min.): RY = 0.0, RZ = 0.825 | | |
| 0.867 | 0.867 | 0.862 |
| | 0.777 | 0.783 |

TABLE 2-continued

| Example 2 | | Amount of Pixel Shift on Screen Surface Si (mm) | | |
| --- | --- | --- | --- | --- |
| 0.717 | | 0.723 | | 0.735 |
| | 0.686 | | 0.701 | |
| 0.671 | | 0.683 | | 0.695 |
| | | | | Average: 0.751 |

| Corresponding Coordinates: FIGS. 15A-15Y | Slightly Decentered Mirror: Second Curved Mirror M2 |
| --- | --- |
| Amount of Decentering (min.): RY = 0.0, RZ = 0.7 | |

| 0.682 | | 0.674 | | 0.647 |
| --- | --- | --- | --- | --- |
| | 0.712 | | 0.701 | |
| 0.740 | | 0.737 | | 0.730 |
| | 0.768 | | 0.768 | |
| 0.801 | | 0.806 | | 0.801 |
| | | | | Average: 0.736 |

| Corresponding Coordinates: FIGS. 16A-16Y | Slightly Decentered Mirror: First Curved Mirror M1 |
| --- | --- |
| Amount of Decentering (min.): RY = 0.0, RZ = 0.21 | |

| 0.740 | | 0.736 | | 0.714 |
| --- | --- | --- | --- | --- |
| | 0.739 | | 0.734 | |
| 0.740 | | 0.739 | | 0.738 |
| | 0.741 | | 0.745 | |
| 0.748 | | 0.754 | | 0.755 |
| | | | | Average: 0.740 |

TABLE 3

| Example 3 | | Amount of Pixel Shift on Screen Surface Si (mm) | | |
| --- | --- | --- | --- | --- |
| Corresponding Coordinates: FIGS. 18A-18Y | | Slightly Decentered Mirror: Fourth Curved Mirror M4 | | |
| Amount of Decentering (min.): RY = 0.0, RZ = 1.5 | | | | |
| 1.089 | | 1.107 | | 1.146 |
| | 0.843 | | 0.881 | |
| 0.638 | | 0.662 | | 0.725 |
| | 0.504 | | 0.554 | |
| 0.416 | | 0.444 | | 0.518 |
| | | | | Average: 0.733 |

| Corresponding Coordinates: FIGS. 19A-19Y | Slightly Decentered Mirror: Third Curved Mirror M3 |
| --- | --- |
| Amount of Decentering (min.): RY = 0.0, RZ = 0.45 | |

| 0.749 | | 0.749 | | 0.730 |
| --- | --- | --- | --- | --- |
| | 0.734 | | 0.734 | |
| 0.728 | | 0.727 | | 0.721 |
| | 0.723 | | 0.725 | |
| 0.730 | | 0.737 | | 0.741 |
| | | | | Average: 0.733 |

| Corresponding Coordinates: FIGS. 20A-20Y | Slightly Decentered Mirror: Second Curved Mirror M2 |
| --- | --- |
| Amount of Decentering (min.): RY = 0.0, RZ = 0.525 | |

| 0.722 | | 0.722 | | 0.699 |
| --- | --- | --- | --- | --- |
| | 0.735 | | 0.731 | |
| 0.752 | | 0.748 | | 0.737 |
| | 0.765 | | 0.763 | |
| 0.786 | | 0.792 | | 0.790 |
| | | | | Average: 0.749 |

| Corresponding Coordinates: FIGS. 21A-21Y | Slightly Decentered Mirror: First Curved Mirror M1 |
| --- | --- |
| Amount of Decentering (min.): RY = 0.0, RZ = 0.23 | |

| 0.749 | | 0.749 | | 0.728 |
| --- | --- | --- | --- | --- |
| | 0.744 | | 0.743 | |

TABLE 3-continued

| Example 3 | | Amount of Pixel Shift on Screen Surface Si (mm) | | |
| --- | --- | --- | --- | --- |
| 0.745 | | 0.743 | | 0.734 |
| | 0.742 | | 0.742 | |
| 0.749 | | 0.756 | | 0.758 |
| | | | | Average: 0.745 |

TABLE 4

| Example 4 | | Amount of Pixel Shift on Screen Surface Si (mm) | | |
| --- | --- | --- | --- | --- |
| Corresponding Coordinates: FIGS. 23A-23Y | | Slightly Decentered Mirror: First Flat Mirror F1 | | |
| Amount of Decentering (min.): RY = 0.0, RZ = 2.5 | | | | |
| 0.616 | | 0.755 | | 1.091 |
| | 0.236 | | 0.506 | |
| 0.102 | | 0.149 | | 0.522 |
| | 0.164 | | 0.343 | |
| 0.284 | | 0.428 | | 0.781 |
| | | | | Average: 0.460 |

TABLE 5

| Example 5 | | Amount of Pixel Shift on Screen Surface Si (mm) | | |
| --- | --- | --- | --- | --- |
| Corresponding Coordinates: FIGS. 25A-25Y | | Slightly Decentered Mirror: First Curved Mirror M1 | | |
| Amount of Decentering (min.): RY = 0.0, RZ = 0.85 | | | | |
| 0.666 | | 0.674 | | 0.683 |
| | 0.663 | | 0.673 | |
| 0.668 | | 0.674 | | 0.689 |
| | 0.698 | | 0.711 | |
| 0.748 | | 0.756 | | 0.766 |
| | | | | Average: 0.698 |

What is claimed is:

1. A projection optical system for obliquely performing enlargement projection of an image formed on a display device surface onto a screen surface,
 wherein a plurality of reflective surfaces are provided, at least one of which is a curved reflective surface having an optical power, and
 wherein, letting the curved reflective surface, out of said at least one curved reflective surface, having a largest effective optical region be the largest curved reflective surface, the reflective surface other than the largest curved reflective surface is slightly decentered at regular time intervals with the largest curved reflective surface kept in a fixed state so as to perform pixel shift at regular time intervals on the screen surface in a vertical direction, or a horizontal direction, or an oblique direction, or vertical and horizontal directions within a range of a pixel pitch.

2. The projection optical system according to claim 1,
 wherein, letting the reflective surface to be slightly decentered be a slightly decentered reflective surface, the slightly decentered reflective surface is arranged next to the largest curved reflective surface on a reduction side thereof.

3. The projection optical system according to claim 2,
 wherein, letting a ray emitted from an image center of the display device surface and passing through a center of an aperture stop be a basic ray, a plane including an incidence ray and a reflecting ray formed by the basic ray with respect to the slightly decentered reflective surface and a plane including an incidence ray and a reflecting ray formed by the basic ray with respect to the largest curved reflective surface are orthogonal to each other.

4. The projection optical system according to claim 3, wherein, as said curved reflective surfaces, a total of four surfaces are provided.

5. The projection optical system according to claim 2, wherein, as said curved reflective surfaces, a total of four surfaces are provided.

6. The projection optical system according to claim 1, wherein, letting the reflective surface to be slightly decentered be a slightly decentered reflective surface and a ray emitted from an image center of the display device surface and passing through a center of an aperture stop be a basic ray, a plane including an incidence ray and a reflecting ray formed by the basic ray with respect to the slightly decentered reflective surface and a plane including an incidence ray and a reflecting ray formed by the basic ray with respect to the largest curved reflective surface are orthogonal to each other.

7. The projection optical system according to claim 6, wherein, as said curved reflective surfaces, a total of four surfaces are provided.

8. The projection optical system according to claim 1, wherein, letting the reflective surface to be slightly decentered be a slightly decentered reflective surface, at least one curved reflective surface is arranged between the largest curved reflective surface and the slightly decentered reflective surface.

9. The projection optical system according to claim 8, wherein an aperture stop and the slightly decentered reflective surface are arranged in order from a reduction side.

10. The projection optical system according to claim 9, wherein, as said curved reflective surfaces, a total of four surfaces are provided.

11. The projection optical system according to claim 8, wherein the slightly decentered reflective surface and an aperture stop are arranged in order from a reduction side.

12. The projection optical system according to claim 11, wherein, as said curved reflective surfaces, a total of four surfaces are provided.

13. The projection optical system according to claim 8, wherein, as said curved reflective surfaces, a total of four surfaces are provided.

14. The projection optical system according to claim 1, wherein, as said curved reflective surfaces, a total of four surfaces are provided.

15. The projection optical system according to claim 1, wherein the reflective surface to be slightly decentered is decentered at intervals that permit the occurrence of after-image phenomena.

16. The projection optical system according to claim 15, wherein the pixels on the screen are shifted in a linear orbit in a reciprocating manner.

17. The projection optical system according to claim 15, wherein the pixels on the screen are shifted in a circular orbit.

18. The projection optical system according to claim 15, wherein the pixels on the screen are shifted in a quadrangular orbit.

19. An image projection apparatus comprising:
a display device; and
a projection optical system for obliquely performing enlargement projection of an image formed on a display device surface onto a screen surface, wherein a plurality of reflective surfaces are provided, at least one of which is a curved reflective surface having an optical power, and wherein, letting the curved reflective surface, out of said at least one curved reflective surface, having a largest effective optical region be the largest curved reflective surface, the reflective surface other than the largest curved reflective surface is slightly decentered at regular time intervals with the largest curved reflective surface kept in a fixed state so as to perform pixel shift at regular time intervals on the screen surface in a vertical direction, or a horizontal direction, or an oblique direction, or vertical and horizontal directions within a range of a pixel pitch.

20. The image projection apparatus according to claim 19, further comprising a screen,
wherein the image projection apparatus is a rear-projection-type image forming apparatus that projects an image to be projected on the screen surface from an opposite side of an observer.

21. The image projection apparatus according to claim 19, wherein the reflective surface to be slightly decentered is decentered at intervals that permit the occurrence of after-image phenomena.

22. The projection optical system according to claim 21, wherein the pixels on the screen are shifted in a linear orbit in a reciprocating manner.

23. The projection optical system according to claim 22, wherein the pixels on the screen are shifted in a circular orbit.

24. The projection optical system according to claim 23, wherein the pixels on the screen are shifted in a quadrangular orbit.

* * * * *